US010698299B2

(12) United States Patent
DeMers et al.

(10) Patent No.: US 10,698,299 B2
(45) Date of Patent: Jun. 30, 2020

(54) TRAIL CAMERA MOUNTING SYSTEM

(71) Applicant: Spy High LLC, Great Falls, MT (US)

(72) Inventors: Michael S. DeMers, Great Falls, MT (US); Simon Evans, Great Falls, MT (US)

(*) Notice: Subject to any disclaimer, the term of this patent is extended or adjusted under 35 U.S.C. 154(b) by 0 days.

(21) Appl. No.: 15/709,276

(22) Filed: Sep. 19, 2017

(65) Prior Publication Data
US 2018/0004071 A1   Jan. 4, 2018

Related U.S. Application Data

(63) Continuation-in-part of application No. 15/262,610, filed on Sep. 12, 2016, now Pat. No. 10,191,357.

(60) Provisional application No. 62/332,910, filed on May 6, 2016, provisional application No. 62/217,653, filed on Sep. 11, 2015.

(51) Int. Cl.
*G03B 17/56* (2006.01)
*F16C 11/06* (2006.01)
*B25G 1/04* (2006.01)
*A01M 31/00* (2006.01)
*F16M 13/02* (2006.01)
*F16M 11/14* (2006.01)
*F16M 11/06* (2006.01)
*F16M 11/20* (2006.01)
*F16M 11/40* (2006.01)

(52) U.S. Cl.
CPC ......... *G03B 17/561* (2013.01); *A01M 31/002* (2013.01); *B25G 1/04* (2013.01); *F16C 11/06* (2013.01); *F16M 11/06* (2013.01); *F16M 11/14* (2013.01); *F16M 11/2078* (2013.01); *F16M 11/40* (2013.01); *F16M 13/02* (2013.01); *F16M 13/022* (2013.01); *F16M 2200/022* (2013.01)

(58) Field of Classification Search
None
See application file for complete search history.

(56) References Cited

U.S. PATENT DOCUMENTS

| 8,109,680 | B2* | 2/2012 | Olien | F16M 11/041 |
| | | | | 396/428 |
| 9,027,895 | B2* | 5/2015 | Hunter | G01C 15/06 |
| | | | | 248/125.8 |
| 9,423,673 | B2* | 8/2016 | Clearman | G03B 17/561 |
| 2011/0222842 | A1* | 9/2011 | Schippers | G03B 17/561 |
| | | | | 396/428 |
| 2015/0316459 | A1* | 11/2015 | Volz | G01N 3/42 |
| | | | | 73/82 |
| 2017/0345536 | A1* | 11/2017 | Breiwa | H01F 38/14 |

* cited by examiner

*Primary Examiner* — Clayton E. LaBalle
*Assistant Examiner* — Dennis Hancock
(74) *Attorney, Agent, or Firm* — Haffey Vap PLLC; Mitchell J. W. Vap

(57) ABSTRACT

The herein described invention is a camera mounting system where the user can safely install a camera high in a tree without having to leave the ground. The camera mounting system is comprised of a tree attachment, ball mount, and camera mount. The system is installed by using an extension pole with releasable capture means for installation and removal of the system. Once installed, a camera can be accurately aimed by using a laser attachment and standard laser pen light. This system is further comprised of a saw attachment, which can be used to clear branches from the installation area of the tree being utilized.

9 Claims, 25 Drawing Sheets

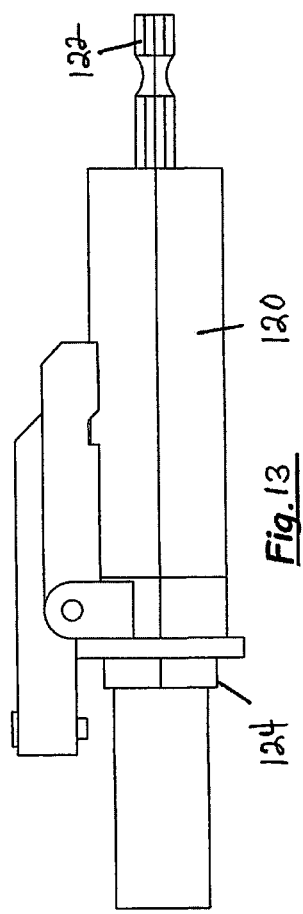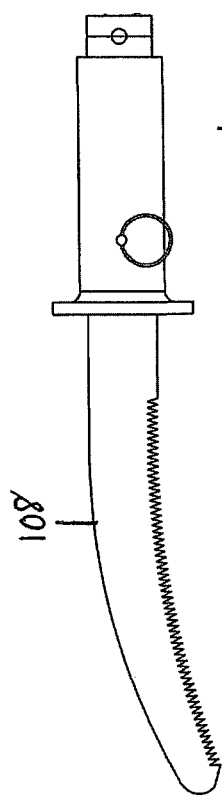
Fig. 13
Fig. 14

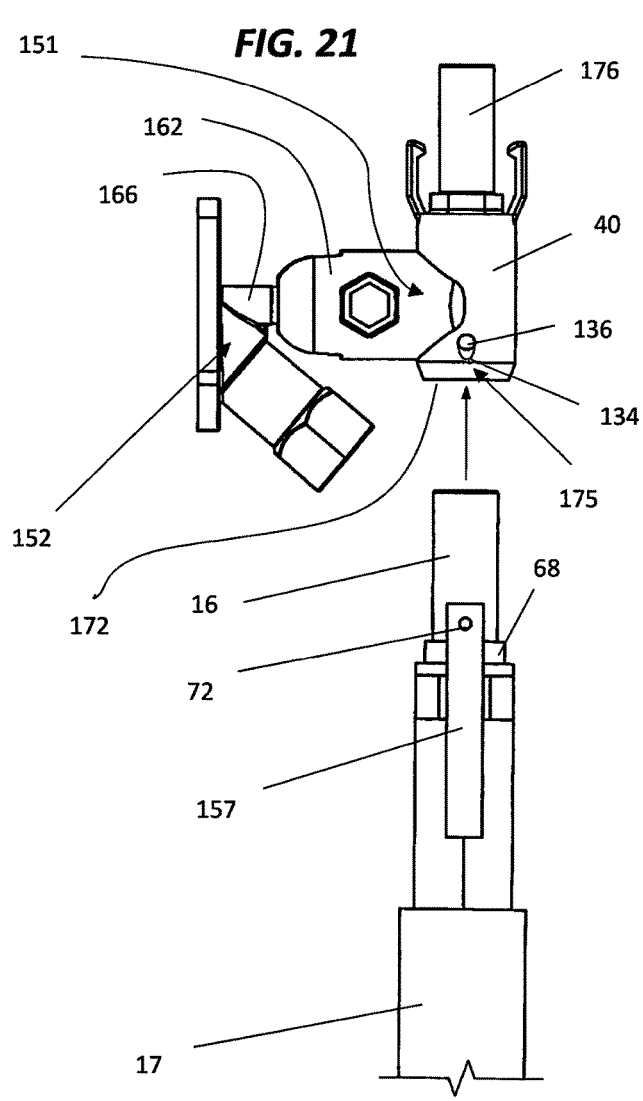
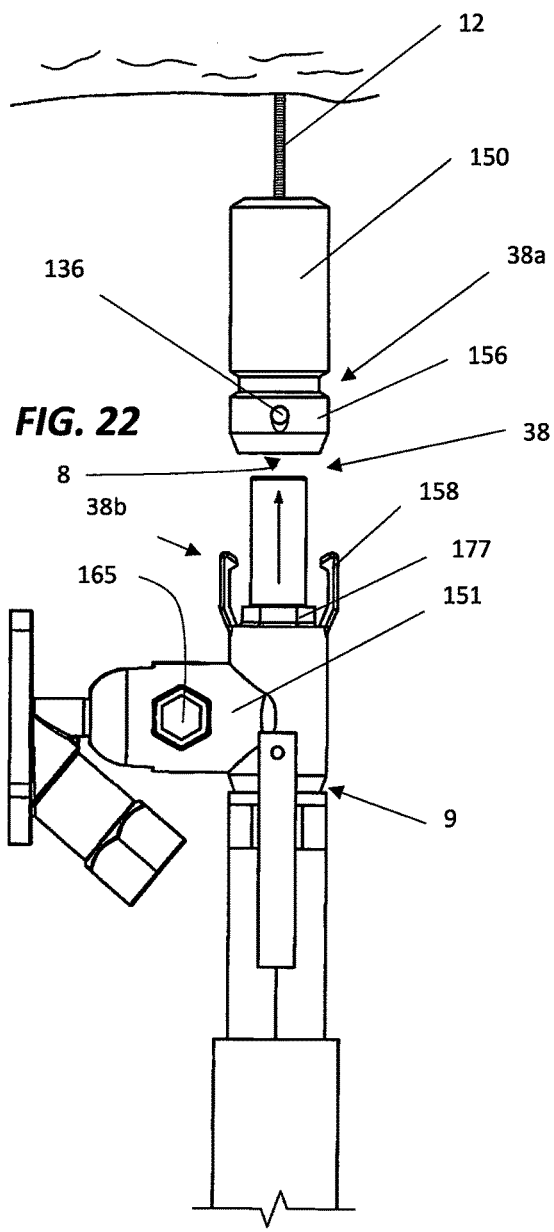

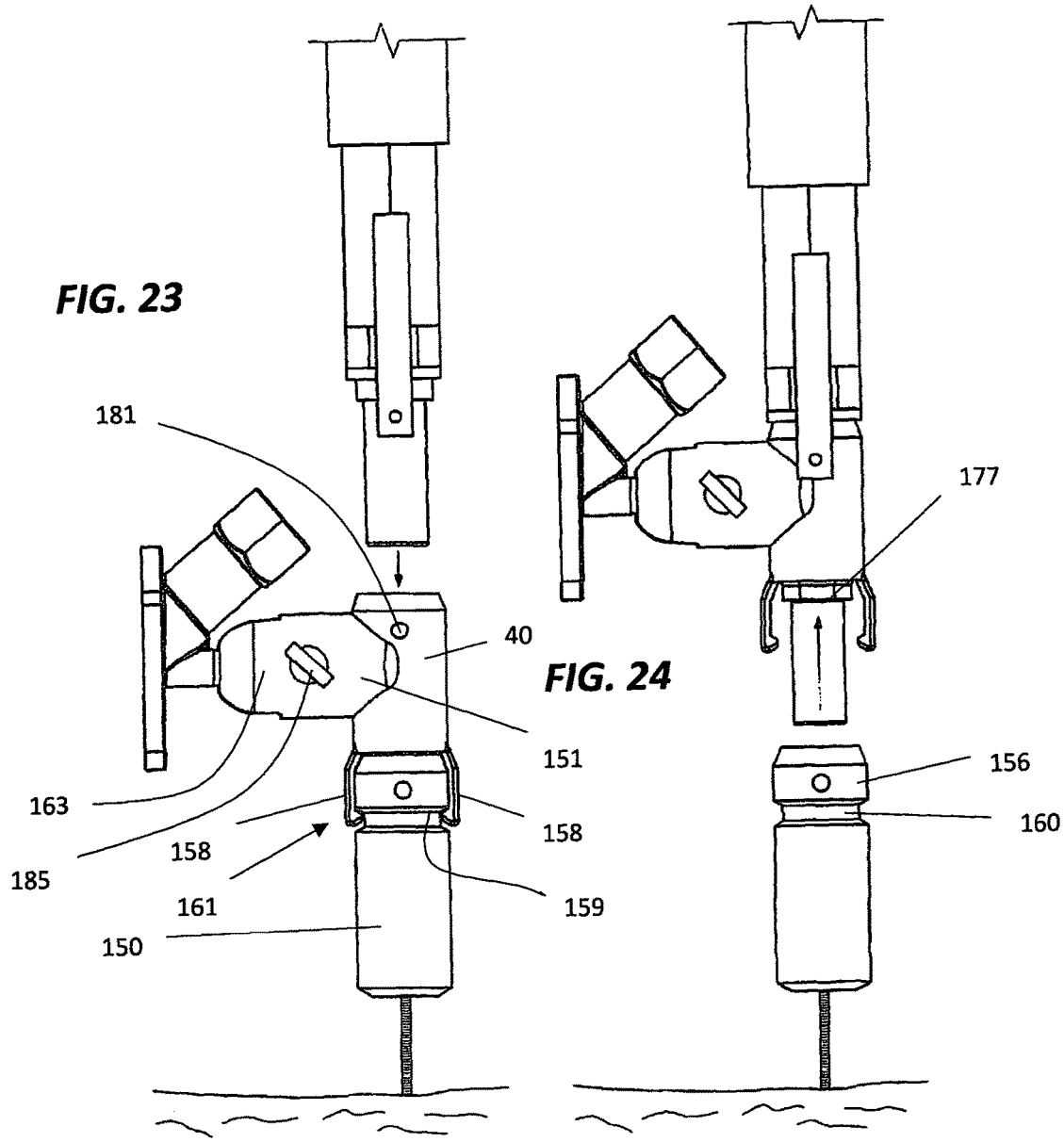

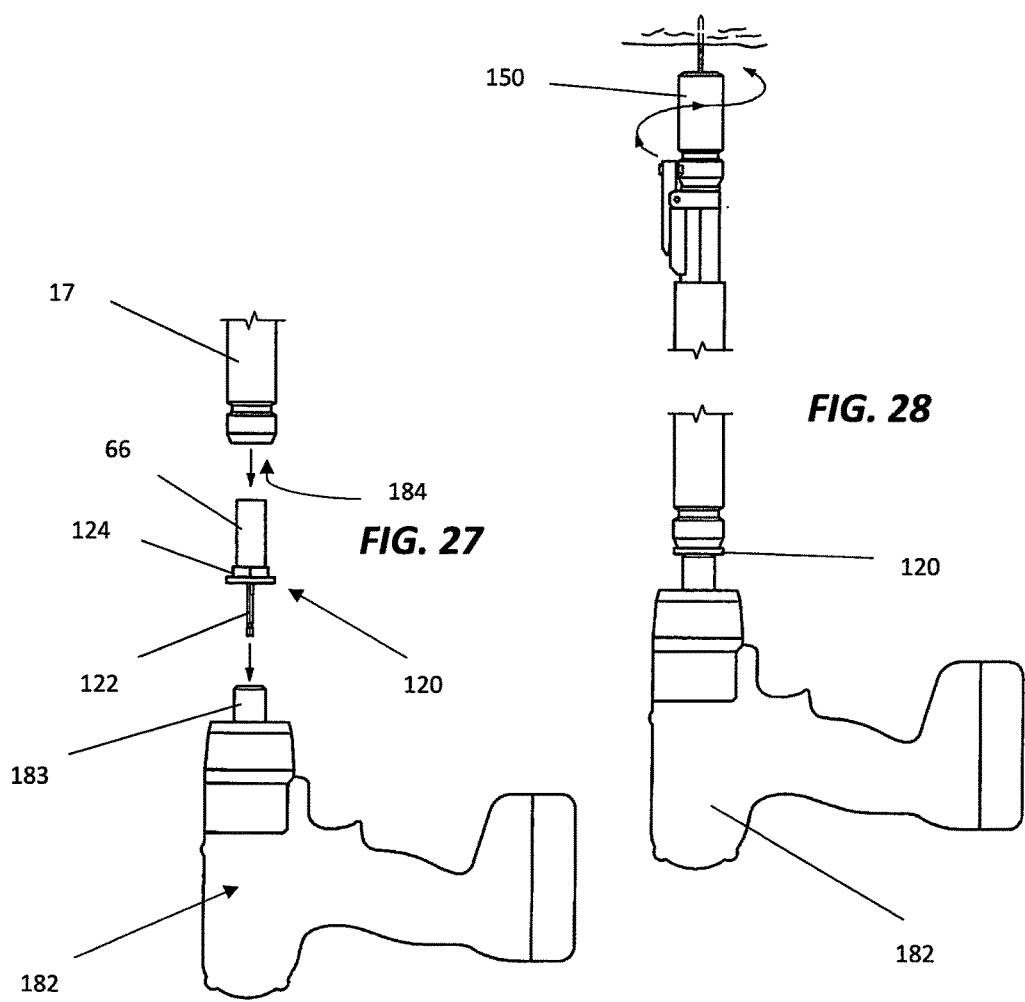

TRAIL CAMERA MOUNTING SYSTEM

CROSS-REFERENCE TO RELATED APPLICATIONS

This is a continuation-in-part of U.S. Non-Provisional application Ser. No. 15/262,610, filed on Sep. 12, 2016, now pending, which application claims priority from U.S. Provisional Application No. 62/332,910, filed on May 6, 2016, and U.S. Provisional Application No. 62/217,653, filed on Sep. 11, 2015, the disclosures of which are hereby incorporated by reference in their entirety to provide continuity of disclosure.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

Trail cameras expose the secrets of the wilderness to a curious man-kind. Hunters use trail cameras to identify game trails and wallows used by potential prey. Wildlife Biologists use trail cameras to track migration patterns and understand species population. Game Wardens use trail cameras to prevent poaching and the destruction of public land. Land owners use cameras for property surveillance and home security. Much of this information is often lost however because trail cameras are frequently stolen. Most trail cameras are placed at game height and are thus easily accessible. Placing a camera mount higher in a tree, out of reach, requires carrying a ladder deep into the woods and then making multiple trips up and down the ladder to aim the camera on the trail. Alternatively, one can shimmy up the tree while trying to carry and then position the delicate camera equipment. A number of trail camera mounting systems have been described (see, for example, U.S. Pat. Nos. 5,626,322; 5,669,592; and 7,975,973 B1, and U.S. Patent Application Publication Nos. 2003/0133708; 2008/0099655; and 2011/0116782, and UK Patent Application GB 2 445 173). Some of these systems have addressed the issue of theft yet none have described a system that can be installed and manipulated remotely. Extension rods and poles have been described to allow someone to extend a tool's reach and perhaps remotely trim a high tree branch (see, for example, U.S. Pat. Nos. 2,703,928; 2,986,054; 3,731,380; 4,607,974; 5,228,202; 5,288,161; 5,787,590; 7,721,391 B2; and 8,875,350 B2) but none have described placing and manipulating a tool or camera remotely.

A need remains for a trail camera mounting system that can be installed high into a tree without leaving the ground. The system should be easy to operate yet hold the equipment securely in the tree. Conveniently, the system would allow for separate removal of the camera for maintenance.

All patents, patent applications, provisional patent applications and publications referred to or cited herein, are incorporated by reference in their entirety to the extent they are not inconsistent with the teachings of the specification.

BRIEF SUMMARY OF THE INVENTION

One embodiment of the invention is a two-piece mounting system that can be manipulated high in a tree by an extension pole. A support attached to the tree connects to a utility bar which holds the camera. Each piece has a fitting that corresponds to a fitting on the extension pole that allows the pieces to be manipulated by the pole. A universal camera mount can be added to the utility bar to mount a trail camera. The universal camera mount is preferably mounted on a swivel so that an adjustment bar connected to the camera mount can be used to adjust the camera when mounted in the tree. The adjustment bar has a fitting that corresponds to the fitting on the extension pole.

In one embodiment, the support includes an auger that bores into a tree. The auger can be placed and turned to bore into the tree by the extension pole. Thus, the support is placed in the tree without having to climb into the tree. In another embodiment, the support includes a clamp that can be tightened around a tree branch. The clamp, like the auger, is placed in the tree without having to climb the tree. The jaws of the clamp are tightened around the tree branch from the ground by the extension pole. Another embodiment of the support of the mounting system of the subject invention includes a mounting plate. The plate can be attached to the side of a building. Although it is necessary to climb to attach the plate to a structure, the camera can be mounted to the plate, manipulated on the plate, and removed from the plate for maintenance by the extension pole without leaving the ground.

In other embodiments, lights or motion detecting lamps can also be mounted to the utility bar to illuminate camp or detect camp intruders. An aperture in an end of the utility bar receives a block and tackle that can be used to hoist loads from the ground. The hoist is useful for storing food away from bears or hanging game for processing.

In another preferred embodiment, the invention is comprised of an injection molded tree attachment, which is comprised of an auger tip screw at the distal end, and hexagon shaped receiving aperture at the proximal end. A cuff at the proximal receiving end of the tree attachment has a recess, which receives a spring loaded securing clasp. The hexagon shaped receiving end receives a correspondingly shaped distal end of an extension pole. The spring loaded securing clasp of the distal end of the extension pole simultaneously engages the cuff recess. Once the tree attachment is engaged on the distal end of the extension pole, the user can extend the pole and drive the tree attachment with auger tipped screw into a tree branch by rotating the extension pole clockwise. Once the tree attachment is placed in the tree, the remainder of the system can be mounted.

Once the tree attachment auger tip screw is driven a sufficient depth into the tree to achieve solid fixation, the extension pole can be disengaged by the user by firmly pulling the extension pole away from the tree attachment. A detaching ramp of the cuff recess allows the extension pole securing clasp snap button to slide into and out of the cuff recess for installation and removal of the tree attachment. Once the tree attachment is placed in the tree, the remainder of the system can be mounted.

This embodiment is further comprised of a utility bar, which comprises a ball mount and a distal first end fitted with two tree attachment clasps, which provide a secure, but releasable capture means to secure the utility bar to the tree attachment. The tree attachment clasps the ridge of the tree attachment receiving end cuff, which secures the utility bar to the tree attachment. The utility bar is further comprised of an upper camera mount ball housing and a ball mount cap, which house the camera mount ball. The camera mount ball housing and ball mount cap can be tensioned together to allow less or more movement of the camera mount ball. The tensioning means in this embodiment includes the use of a standard bolt installed through a corresponding hole in the camera mount ball housing and ball mount cap. A corresponding thumbscrew can then be tightened or loosened to allow movement of the camera mount ball to user preference.

The upper surface of the camera mount ball contains a hole, which accepts the camera mount post. Once the camera mount post is seated within the camera mount ball, the camera mount can be positioned to user preference. The top camera mounting surface of the camera mount is further comprised of a removable camera mount pad, which provides a level surface for camera mounting. A camera is mounted by utilizing the universal camera screw which protrudes upward from the camera mounting surface. A standard game camera can be mounted by first mounting a universal game camera bracket to said mounting surface with the camera mount screw. A game camera can then be mounted to the game camera bracket with standard mounting means.

Once the utility bar is ready for installation onto the tree attachment, the user inserts the distal post of the extension pole into the proximal receiving end of the utility bar? so that the spring-loaded clasp and snap button of the distal extension pole engages the "install" recess of the proximal utility bar. The user can then extend the pole to install the utility bar onto the secured tree attachment. To install the utility bar, the user directs the distal end of the utility bar into the tree attachment receiving aperture until the tree attachment clasps engage the ridge of the tree attachment receiving end cuff.

Once the utility bar is installed onto the tree attachment, the user disengages the extension pole by firmly pulling the extension pole away from the utility bar. A recessed ramp of the "install" recess pit of the proximal utility bar allows the extension pole securing clasp snap button to slide into and out of the install recess pit for installation. The tree attachment clasps engage the tree attachment with more force than the longitudinal force generated when the extension pole clasp and snap button disengage from the "install" recess, thus allowing the utility bar to be retained on the tree attachment.

Once the utility bar is secured onto the tree attachment, with mounted camera, the camera mount can be accurately aimed by using a laser attachment. Said laser attachment clips on to the distal end of the extension pole. A standard laser pen light is then placed in the pen light clasp and turned on. The distal end of the extension pole is then inserted into the proximal camera mount receiving end. The laser attachment with laser pen and mounted camera are then aligned so the projected laser dot shows the area where the camera will be recording. The user then manipulates the camera mount/laser attachment to achieve the desired recording area of the camera.

To remove the system, the user inserts the distal end post of the extension pole into the proximal utility bar receiver so the spring-loaded clasp of the extension pole clasps the "remove" recess pit of the proximal utility bar receiving end. The "remove" recess pit does not include a recess pit ramp, thus the extension pole spring loaded clasp cannot slide out of the "remove" recess pit. Therefore, the longitudinal force generated by the user by pulling the extension pole away from the utility bar, exceeds the holding capability of the tree attachment clasps, which allows the utility bar to disengage from the tree attachment.

The tree attachment can be uninstalled from the tree by the user inserting the distal end post of the extension pole into the proximal receiving aperture of the tree attachment so the spring-loaded clasp of the extension pole clasps the tree attachment cuff recess pit. The extension pole is then rotated counterclockwise to unscrew the auger tip from the tree.

In another embodiment, the proximal end of the extension pole accepts a drill attachment. Said drill attachment can receive any standard powered drill. Said drill can then be used to turn the extension pole clockwise during installation of the tree attachment, or counterclockwise for uninstalling the tree attachment.

BRIEF DESCRIPTION OF THE SEVERAL VIEWS OF THE DRAWINGS

FIG. 13 is side elevational view of a preferred embodiment of a drill adapter for use with the mounting system of the subject invention.

FIG. 14 is side elevational view of a preferred embodiment a saw blade for use with the mounting system of the subject invention.

FIG. 21 is a side elevational view of the distal extension pole engaging ball mount receiving aperture and "install" recess pit with recessed ramp.

FIG. 22 is a side elevational view of installation of ball mount on to proximal tree attachment.

FIG. 23 is a side elevational view of the distal extension pole engaging ball mount receiving aperture and "remove" recess without recessed ramp.

FIG. 24 is a side elevational view of removal of ball mount from proximal tree attachment.

FIG. 27 is a side elevational view of proximal extension pole drill attachment.

FIG. 28 is a side elevational view of proximal extension pole drill attachment turning tree attachment to bore auger tip into tree.

DETAILED DESCRIPTION OF THE INVENTION

One embodiment of the invention involves a two-piece mounting system for a trail camera. Each piece is placed by an extension pole so the mount can be placed high into a tree. A support attaches to the tree. A utility bar connects to the support through a releasable capture means and holds a universal camera mount on a swivel with an adjustment bar.

The support of the two-piece mounting system of the subject invention has a fitting that corresponds to a fitting on the utility bar and the extension pole. This allows some embodiments of the support to be placed remotely using the extension pole. The fittings allow the utility bar to be placed on the support and manipulated remotely by the extension pole in all embodiments of the subject mounting system.

Figure 1:
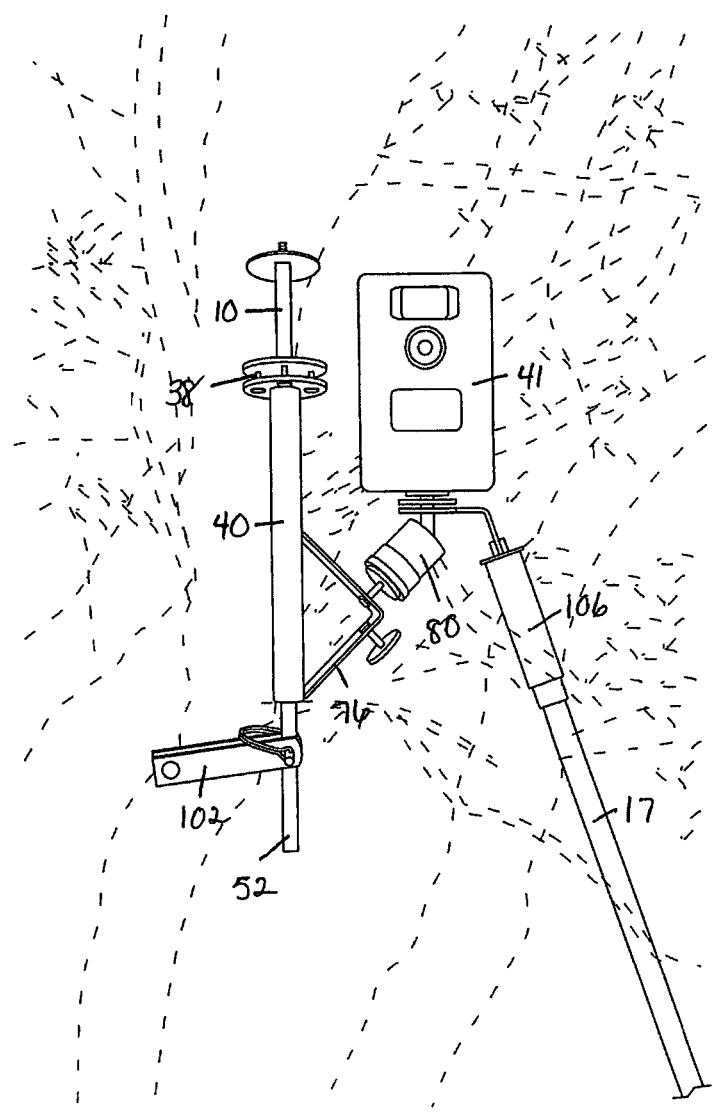
FIG. 1 is an environmental view of a preferred embodiment of the mounting system of the subject invention.
Figure 8:
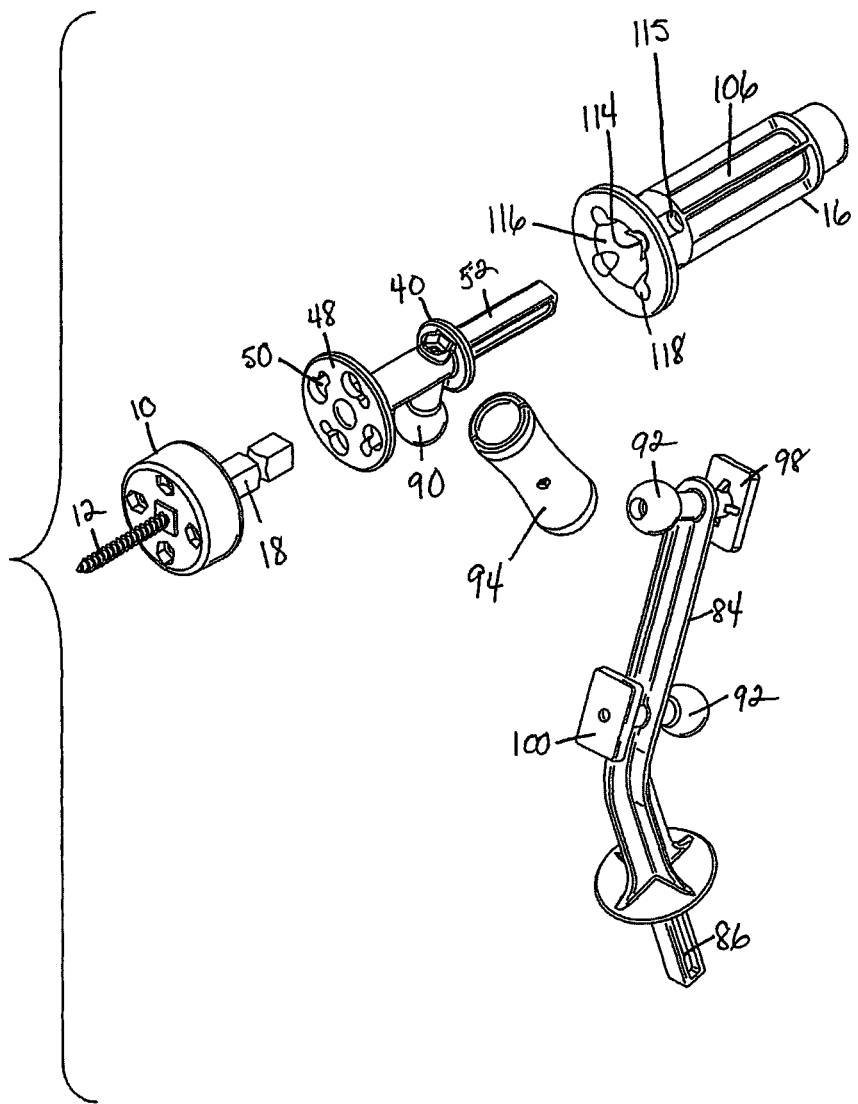
FIG. 8 is a front isometric partial exploded view of another preferred embodiment of the mounting system of the subject invention.
Figure 9:
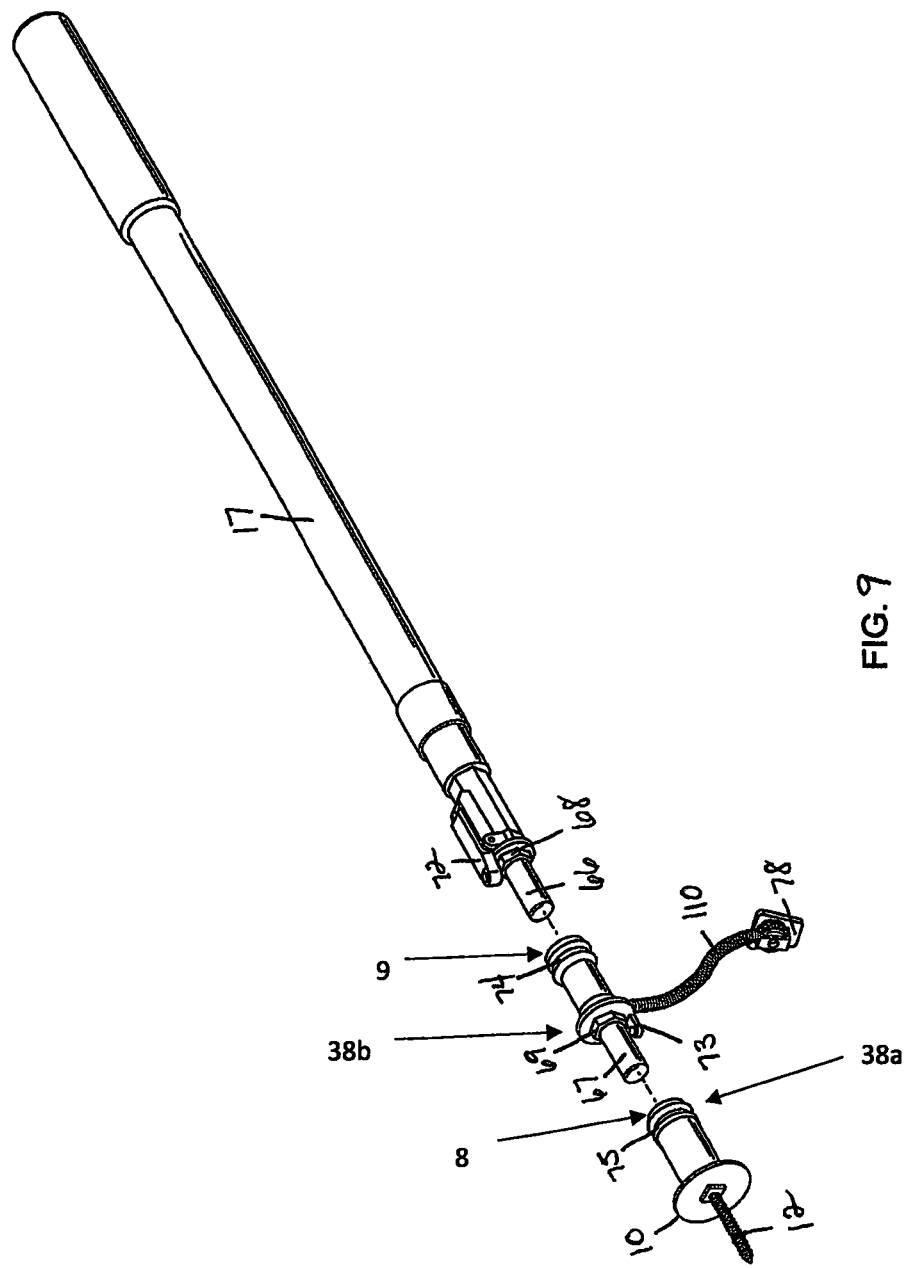
FIG. 9 is a front isometric exploded view of another preferred embodiment of the mounting system of the subject invention.
Figure 11:
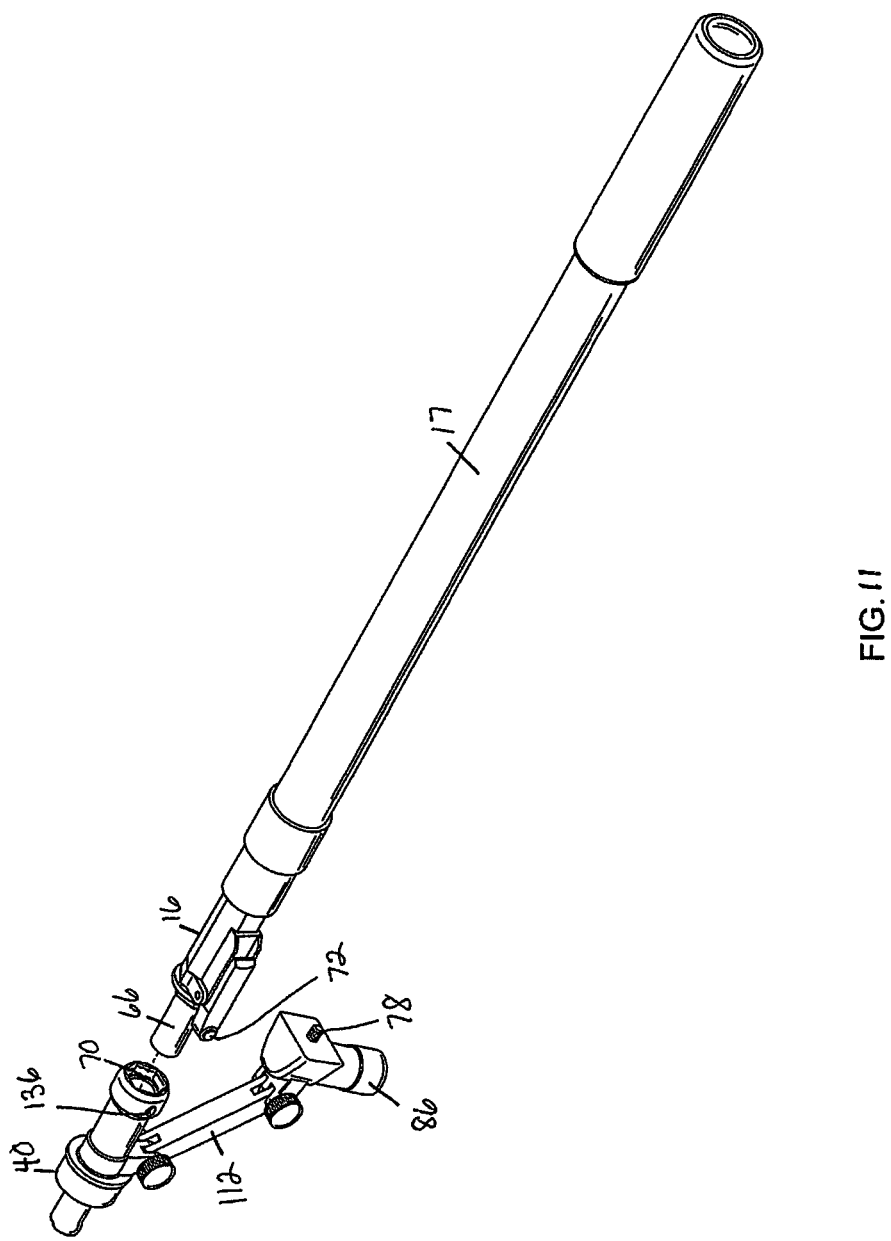
FIG. 11 is a rear isometric partially exploded view of another preferred embodiment of the mounting system of the subject invention.

The support 10 has an anchoring means to attach the support to a surface. In a preferred embodiment, the anchoring means is an auger 12 that bores into a branch attaching the support to a tree. A support fitting 14 is on one end of the support opposite the auger. The support fitting 14 corresponds to a pole fitting 16 on the extension pole 17 which is used to drive the auger into the tree. The corresponding fittings can be any shape or configuration, it is only necessary that they possess the strength and stability to manipulate the mounting system pieces remotely. In an exemplified embodiment, the support fitting on the auger is a square tubular rod 18. The support fitting is inserted into a square companion fitting 114 of the extension pole fitting 16 (FIG. 8). The square shape allows the extension rod connected to the auger through the fitting to be twisted to drive the auger into the tree. In the embodiment shown in FIG. 8, the pole fitting 114 is created by an adapter 106 added to the end of the pole. The square companion fitting 114 receives the square rod 18 while a cup 116 near the top of the adapter 106 has divots 118 to accept the flattened heads of pins of the releasable attachment means described below. A spring tension ball 115 holds the square tubular rod 18 in the adapter 106 until sufficient downward force is applied to pull the fittings apart. The pole fitting 16 need not however be created by an adapter and can be a part of the pole (FIGS. 9 and 11). In the embodiment shown in FIGS. 1 and 2, the material, powder coated steel, and length of the fitting contribute to the needed strength of the fitting in this embodiment. Fittings can also be made of plastic or composite. It would be apparent to one skilled in the art how to choose the proper configuration and materials for a fitting that possesses the necessary qualities to allow manipulation of system pieces by the extension pole. FIGS. 13, 27, and 28 show a drill adapter 120 to assist in driving the pieces of the subject invention. The drill adapter has a shank 122 and a drill adapter fitting 124 like the pole fitting 16. One skilled in the art would likewise understand that anticipating using a power drill with the subject system may require adjustment in the choice of material used for system components as well as choosing the size and shape of the fitting. The drill adapter shown in the exemplified embodiment hooks to the extension pole fitting allowing the drill to be used when placing the support remotely.

Figure 12:
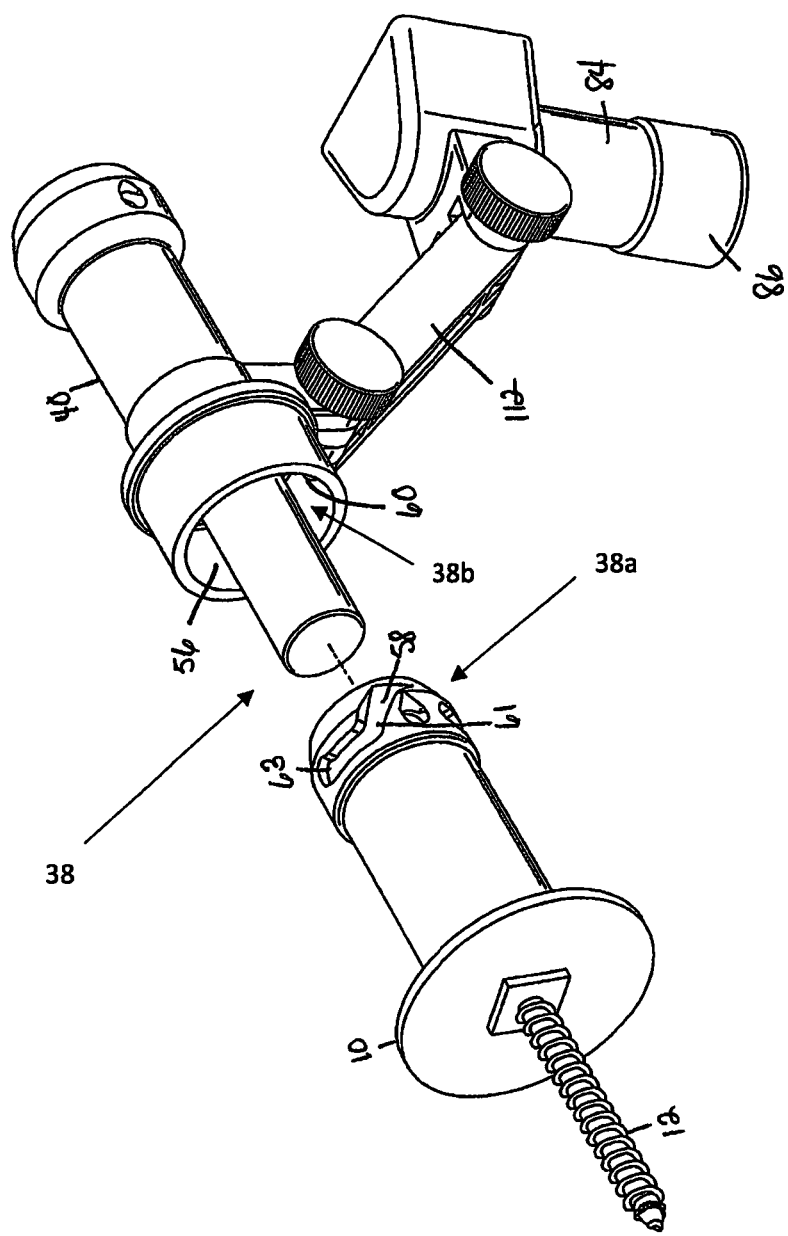
FIG. 12 is a front isometric exploded view of the support and utility bar connection of the mounting system shown in FIG. 11.

Pieces of the subject mounting system can be made of not only steel, but aluminum, plastics, or composites. The fittings can include adapters 106 made to convert available extension poles for use with the subject invention (FIG. 8) or the fittings on system pieces can be configured to complement the fittings on available poles (FIG. 12). Additionally, connecters can be used to connect two extension poles together allowing the subject system to be mounted higher in a tree.

Figure 4:
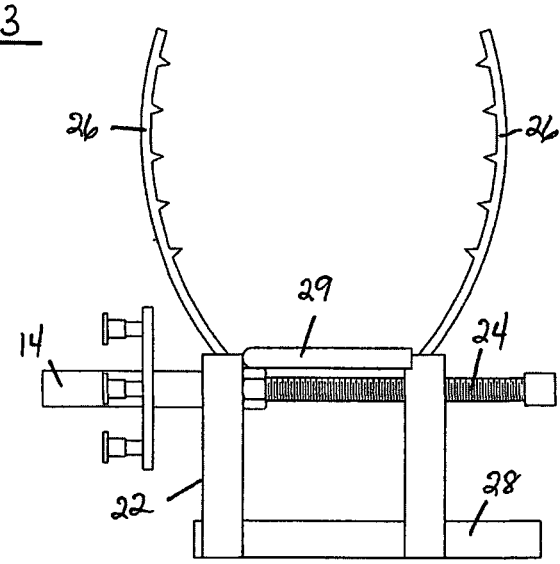
FIG. 4 is side elevational view of a preferred embodiment of a support of the mounting system of the subject invention.

In another preferred embodiment, a clamp 22 can be used as the anchoring means of the support of the two-piece mounting system of the subject invention (FIG. 4). The support fitting 14 is rigidly connected to a threaded bolt 24 that pulls the jaws 26 of the clamp together as the fitting is turned by the extension pole. Bar 28 keeps the jaws of the clamp in alignment as they are being drawn together. A stabilizing rod 29 captures the branch and prevents the clamp from spinning about the branch as the jaws are being tightened. Using the jaws to mount the system prevents the need to bore a deep, potentially damaging, and destabilizing hole into the tree branch.

Figure 3:
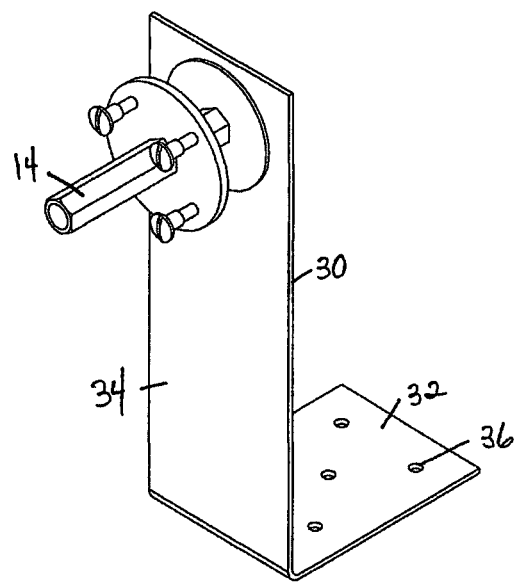
FIG. 3 is a rear isometric view of another preferred embodiment of a support of the mounting system of the subject invention.

Another preferred embodiment of the support for the two-piece mounting system of the subject invention is shown in FIG. 3. In this embodiment, the support includes a mounting plate 30. The plate has a support fitting 14 affixed to the plate to which the utility bar is mounted. In the exemplified embodiment, the plate has a back 32 used to attach the plate to the structure and a platform 34. The back has holes 36 so that the plate can be mounted to a vertical structure such as a building. In this embodiment, one must climb a ladder to position the plate. After the plate is attached to the building however the camera can be placed, positioned, and maintained from the ground using the extension pole.

Figure 7:
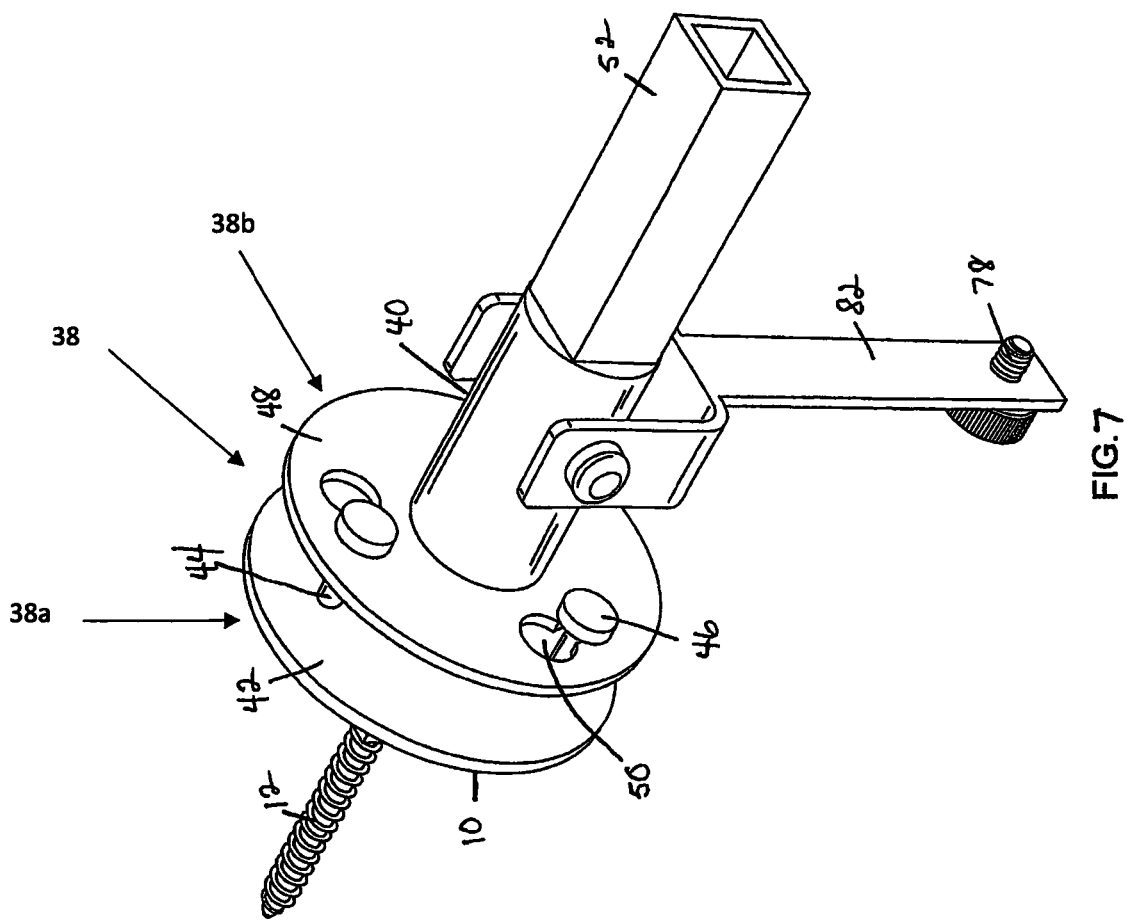
FIG. 7 is a rear isometric view of a preferred embodiment of a utility bracket of the mounting system of the subject invention.

The support also contains part of the releasable capture means 38 that connects the support 10 to the utility bar 40. An advantage of the two-piece system of the subject invention is that the utility bar can be released from the support. Therefore, anything attached to the utility bar, for example, a trail camera 41, can be brought down to check its condition or change its batteries without having to remove the entire system from the tree. The support releasable capture means 38a captures and holds the complementary utility bar releasable capture means 38b during installation of the system and is releasable for uninstallation of the system. In one exemplified embodiment, the releasable capture means 38 is a simple spring-loaded twist-to-lock system. The support releasable capture means 38a is comprised of a support plate 42 which has pins 44 with flattened heads 46, for example, screw heads, protruding from the support plate 42 toward the corresponding fitting of the utility bar 40, which comprises the utility bar releasable capture means 38b. (FIG. 7). In this embodiment, the utility bar releasable capture means 38b is comprised of a utility bar plate 48, which has openings 50 to receive the flattened heads 46 that taper (FIG. 8) as the heads move within the openings 50 to hold the flattened heads 46 to the utility bar plate 48 once received. A spring (not shown) provides the pressure to hold the flattened heads 46 in place and to connect the utility bar 40 to the support 10. In the exemplified embodiment, the support plate 42 has protruding pins with flattened heads 46 and is located on the support 10 while the utility bar plate with the openings 50 is located on the utility bar 40. It should be apparent however, that this embodiment of the releasable capture means 38 would work equally as well if the position of each piece was reversed. This situation is likewise applicable for any of the releasable capture means discussed. In the present exemplified embodiment of the utility bar 40, the end opposite of the utility bar plate 48 has a utility bar fitting 52 that receives the extension pole fitting 16, the pole turns the utility bar 40 to capture the flattened heads 46 in the tapered ends of the openings 50. A preferred embodiment of the tapered openings 50 of this embodiment has a recessed shoulder so that the screw heads locked in the opening will be flush with the surface of the plate.

Figure 5:
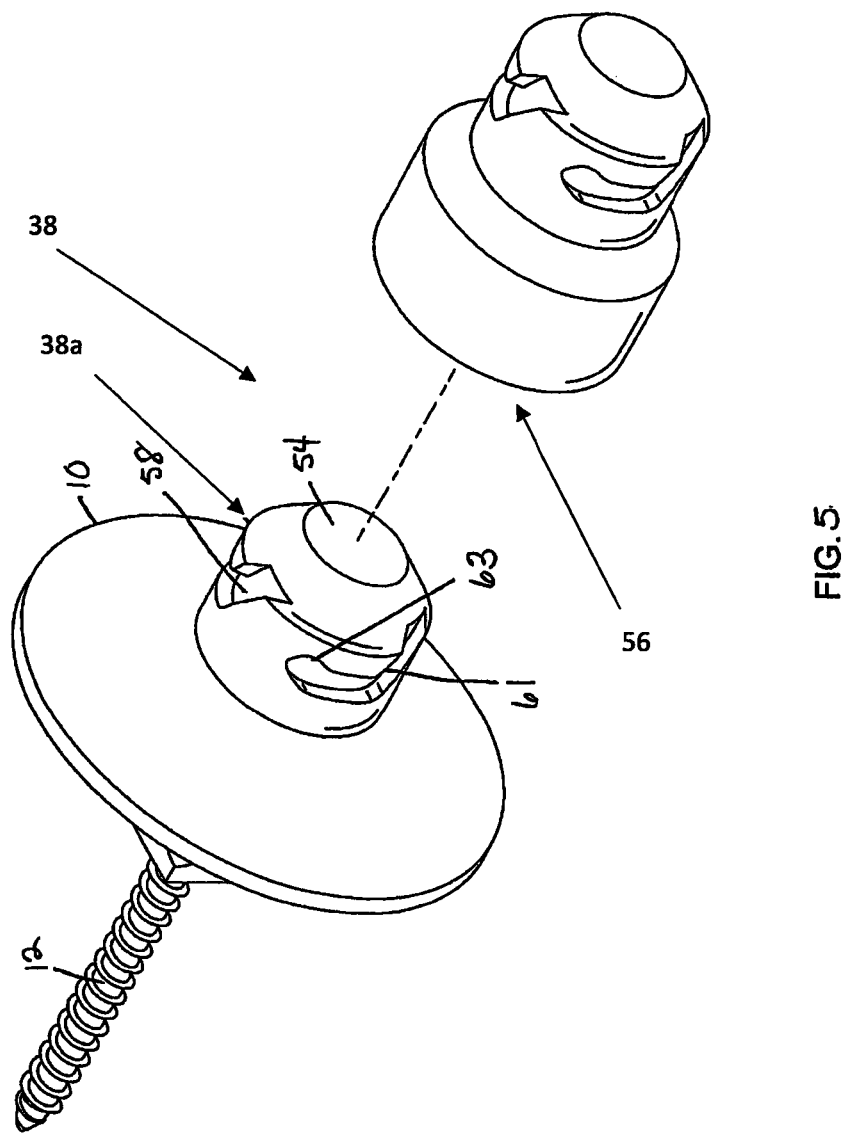
FIG. 5 is a rear isometric view of another preferred embodiment of a support of the mounting system of the subject invention.

FIGS. 5 and 12 show another preferred embodiment of a releasable capture means 38 of the mounting system of the subject invention. In this embodiment, the releasable capture means 38 is a bayonet-type connection where the support releasable capture means 38a is comprised of a stub 54 which accepts a corresponding socket 56, which comprises the utility bar releasable capture means 38b. The stub 54 has grooves 58 that engage knobs 60 in the socket 56 (FIG. 12). The knobs 60 move along the grooves 58 as the stub 54 is twisted in the socket 56. In the exemplified embodiment, the grooves have an incline 61 that draws the stub 54 into the socket 56 as it is twisted. The grooves terminate in a recess 63 as the grooves turn slightly back toward the entry of the grooves to lock the knobs 60 in the terminus of the grooves 58. The stub or socket can also be spring-loaded to assist in securing the stub within the socket. In this preferred embodiment, the stub 54 is located on the support 10 and accepts the corresponding socket 56, located on the utility bar 40. It should be apparent however, that this embodiment of the releasable capture means 38 would work equally as well if the position of each piece was reversed.

Figure 6:
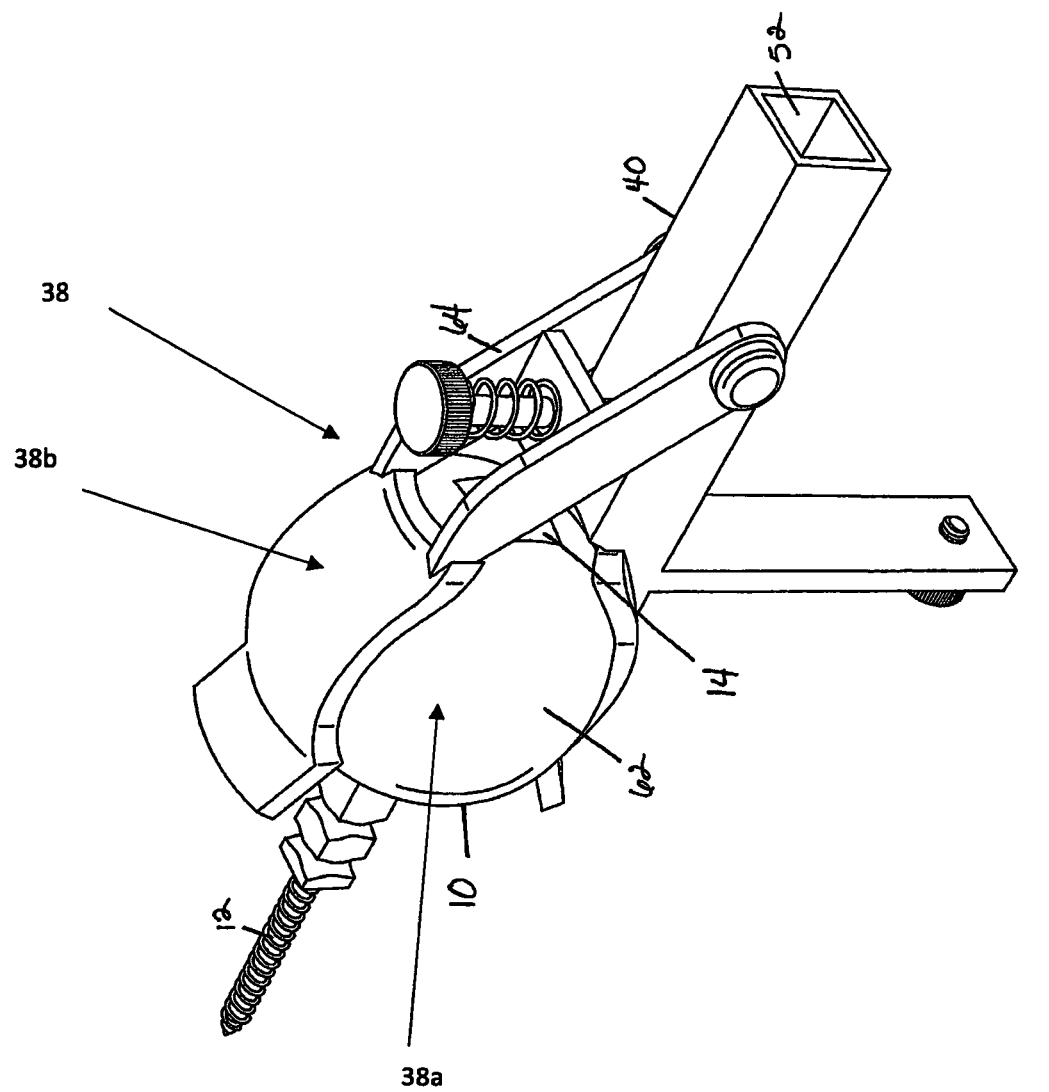
FIG. 6 is a rear isometric view of a preferred embodiment of a releasable capture means of the mounting system of the subject invention.

Another preferred embodiment of the releasable capture means 38 used to connect the support 10 to the utility bar 40 of the mounting system of the subject invention is shown in FIG. 6. In this embodiment, the utility bar releasable capture means 38b is comprised of a spring-loaded clamp 64, which captures and holds a ball 62. The ball 62 comprises the support releasable capture means 38a. In FIG. 6 the ball 62 is connected to the support 10 and receives the clamp, which is connected to the utility bar. It would be apparent to one skilled in the art however, that the means would work equally as well if the ball was on the utility bar and the clamp was on the support. It is also noted that in FIG. 6 the support fitting 14, and utility bar fitting 52 receive a square rod, the converse of FIG. 2, further illustrating that the positioning of the parts of the releasable capture means as well as the parts of the complementary fittings can be reversed and still function within the subject mounting system.

Figure 10:
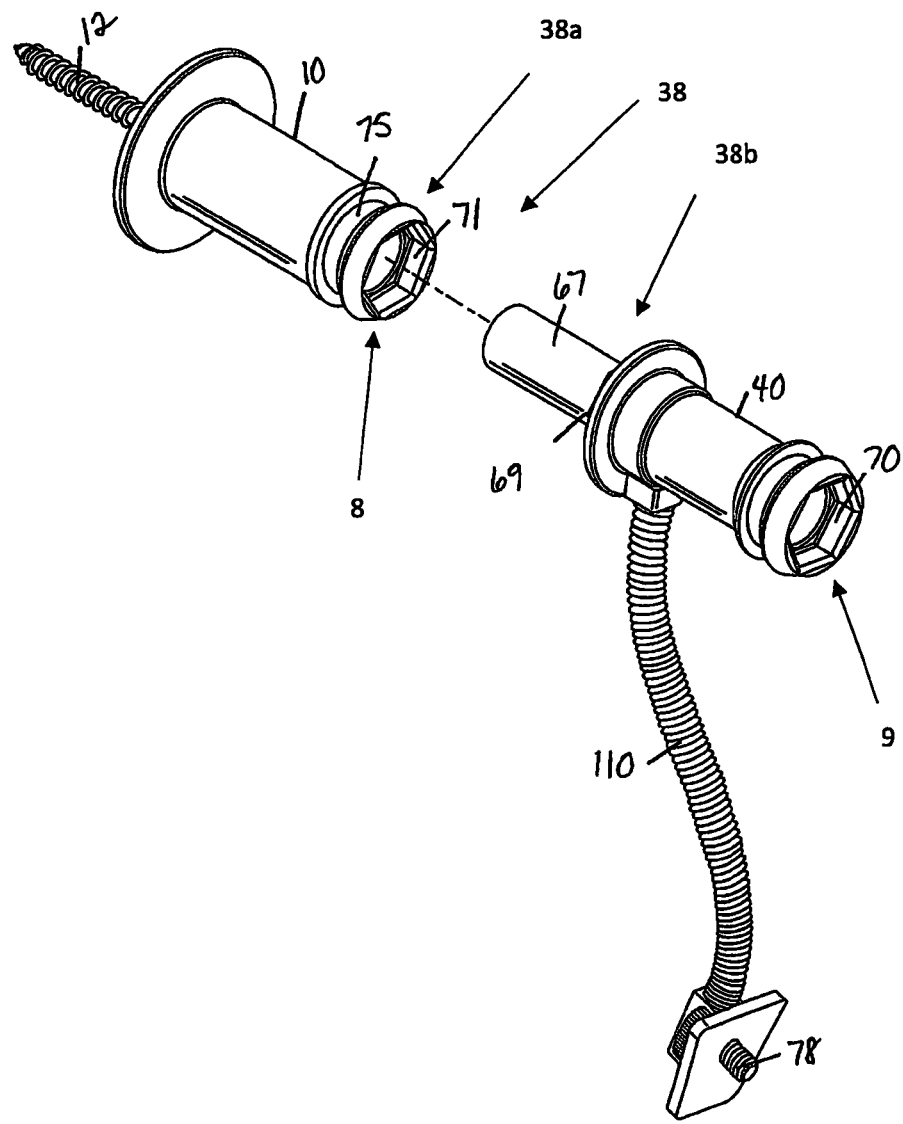
FIG. 10 is a rear isometric partial exploded view of the support and utility bar connection of the preferred embodiment shown in FIG. 9.

FIGS. 9 and 10 show another preferred embodiment of the releasable capture means 38 of the subject mounting system. In this embodiment, the means mimics the fitting configuration of an available extension pole 17 shown in FIGS. 9 and 11. The distal end of the extension pole 17 has a post 66 with a hexagonal neck 68 at its base. The post 66 is received by the complementary support fitting 8 and utility bar fitting 9, the neck 68 dropping into a support hexagonal recess 71, and utility bar hexagonal recess 70 in that fitting. A snap button 72 engages a utility bar collar 74 to hold the utility bar fitting 9 together. Likewise, the releasable capture means 38 connecting the utility bar 40 to the support 10 (shown in FIGS. 9 and 10) includes a utility bar post 67 with a hexagonal neck 69 which drops into a complementary support fitting 8 with a hexagonal recess 71. A snap button 73 engages a collar 75 to hold the releasable capture means 38 together. The support releasable capture means 38a is comprised of support fitting 8 with a hexagonal recess 71, and a collar 75. The utility bar releasable capture means 38b is comprised of a utility bar post 67 with a hexagonal neck 69, and a snap button 73, which engages the collar 75 of the support releasable capture means 38a. It may be necessary for the snap buttons 72, 73 to yield under different pressure since the snap button on the extension pole 17 is used to place the mounting system pieces and then be removed while the configuration used as a releasable capture means 38 connecting the utility bar 40 to the support 10 must maintain its connection after the pole is removed. Differing the pressure or yield angles on the collar are used to customize the release of the various snap buttons.

One skilled in the art would understand that a number of releasable capture means could be used on the subject invention. In an alternative embodiment, a releasable capture means includes a lever pivotally connected through a wall of the auger. The lever engages the spring-loaded fitting as it enters the end of the auger. To release the connection, a tab on the lever is pulled or pushed and the pieces are separated.

The utility bar 40 connects to the support 10 by releasable capture means 38. The utility bar 40 can have a fitting at one end configured to engage the complementary fitting end of the support 10. The fitting end of the support 10 end also contains part of the releasable capture means 38. A fitting to engage the extension pole 17 is disposed at the other end of the utility bar.

Figure 2:
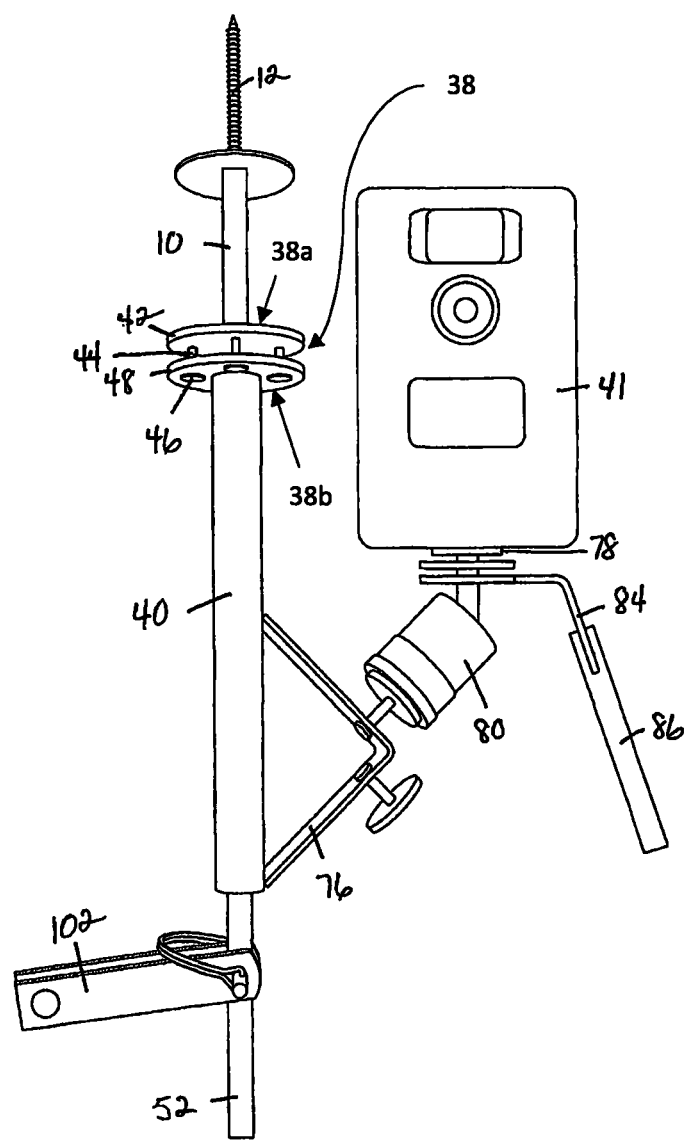
FIG. 2 is a side elevational view of the preferred embodiment shown in FIG. 1.

The utility bar 40 is used to mount accessories to the subject system. In FIG. 2 a bracket 76 positioned along the utility bar to which an accessory can be mounted. The system is used primarily as a trail camera mounting system that allows the user to mount a trail camera 41 high above the trail so it will not interfere or be detected by wildlife and also so it is out of the reach of thieves. One skilled in the art would realize that there are a number of camera mounts that can be used with the subject system. A preferred camera mounting system includes a universal camera mount 78 atop a swivel 80. The swivel allows the camera's angle to be adjusted so that the camera can capture movement from any set angle. Another embodiment that provides movement to the camera mount 78 is the U-bracket 82 shown in FIG. 7. An adjustment bar 84 on the camera mount allows the camera to be positioned after it is in the tree. The adjustment bar 84 has an adjustment bar fitting 86 that corresponds to the pole fitting 16. Once positioned in the tree, the extension pole can be used to aim the camera where desired. To further assist in aiming the camera, a laser or other aiming device can be mounted on or near the camera and the laser can be used to determine the position of the camera's focus. The aiming device can be associated with mounting system pieces, for example the extension pole. Alternatively, the laser can clip to the camera or a clip can be provided to receive the laser.

FIG. 8 shows a sphere 90 mounted on the utility bar 40. The sphere can be used with and received by a variety of camera mounts to allow full adjustability and positioning of the camera. While an adjustment bar with a universal camera mount could be mounted directly to the ball, the hook-up 94 shown in FIG. 8 can be used to connect the adjustment bar 84 to the utility bar to provide a stout mount that can be fully manipulated. The hook-up 94 receives the sphere 90 on the utility bar and a sphere 92 on the adjustment bar. This configuration provides full movement of a camera mounted on the device as device pieces move about the spheres. The adjustment bar in this embodiment is configured to support a camera with either a bottom camera mount or a back-camera mount (FIG. 8). The adjustment bar 84 platforms 98, 100 on the top of the bar and on the bottom of the bar, respectively, to receive and support universal camera mounts including camera quick shoes. Other adjustable interfaces by which the camera can be mounted to the utility bar that provide full camera positioning include, but are not limited to, a flex arm 110 (FIG. 10) and an arm with meshed hinge compression style connections 112 (FIG. 12).

It is noted that although the subject mounting system is described for mounting a trail camera, the system can be used to mount other items. For example, flood lights can be mounted to the utility bar to illuminate an outdoor work area. Motion sensing lights can be mounted to illuminate a campsite and make late night relief trips into the bushes less dangerous. A rail 102 inserted into an aperture in the utility bar can support a block and tackle to allow the system to be used to hoist a load off the ground. The hoist does not interfere with the utility bar and thus the hoist can be used while a camera or light is in place.

Figure 15:
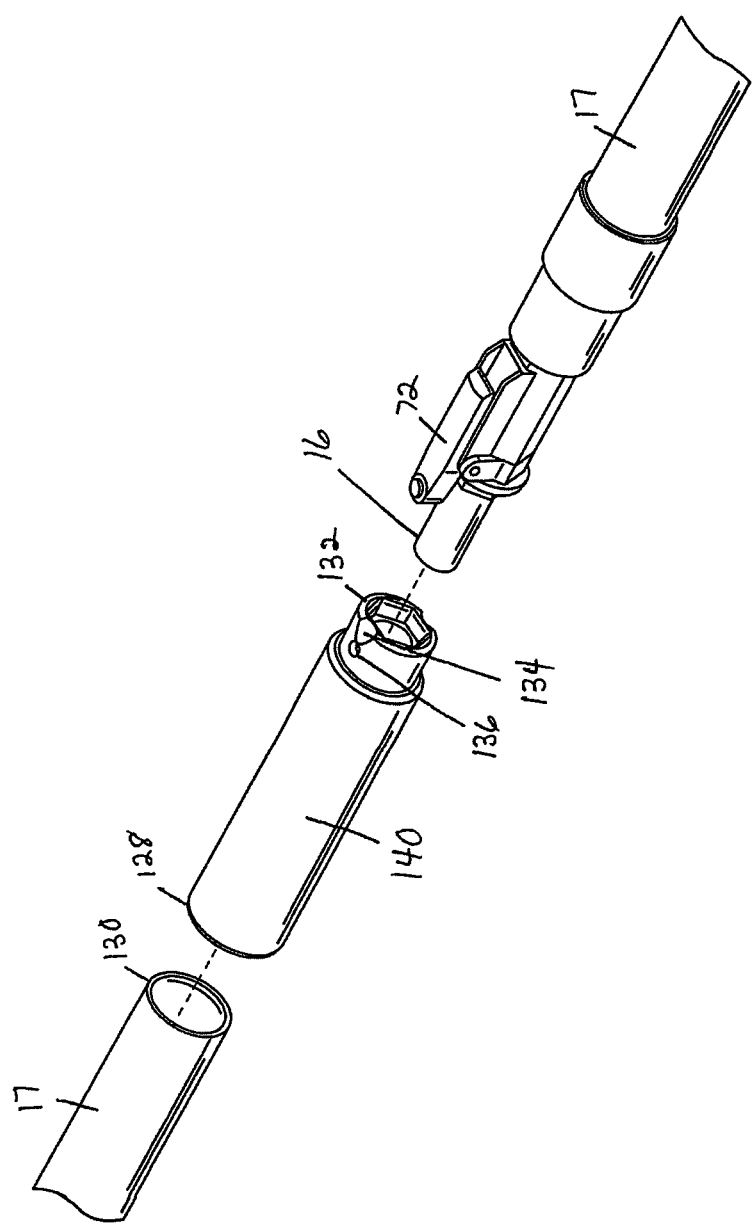
FIG. 15 is a rear isometric view of a preferred embodiment of a connector to connect two extension poles to one another.
Figure 16:
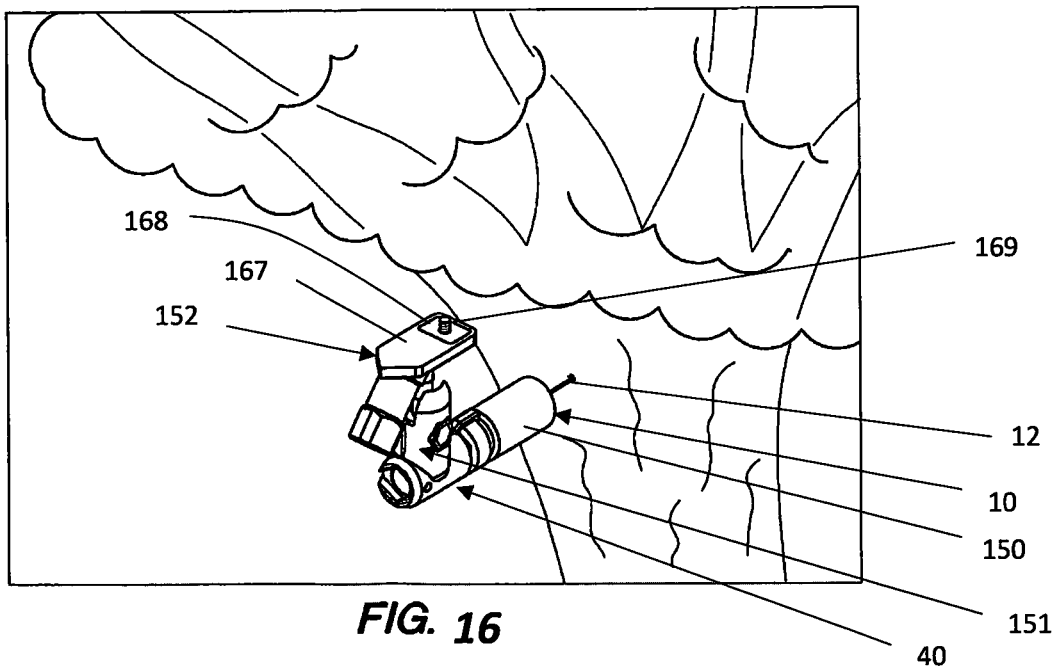
FIG. 16 is an environmental perspective view of a preferred embodiment of the invention installed in a tree.
Figure 17:
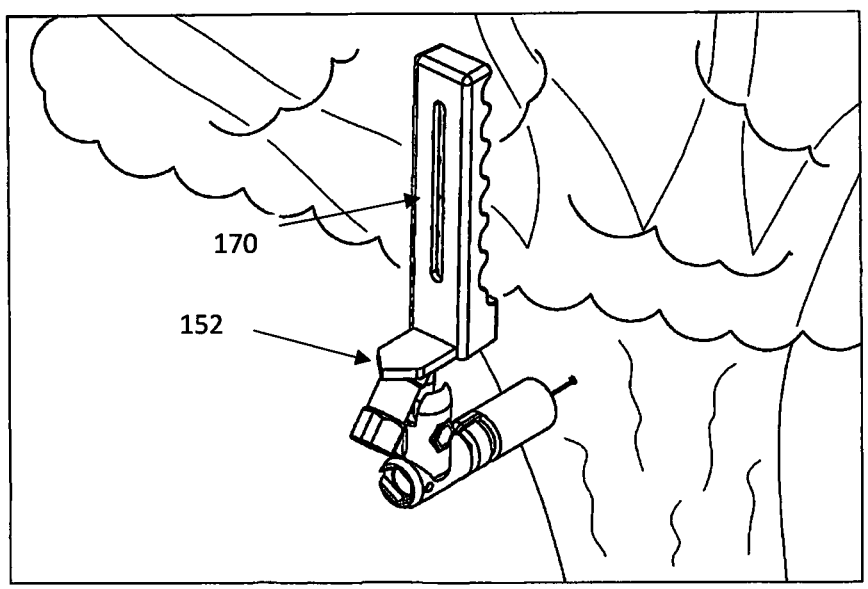
FIG. 17 is an environmental perspective view of a preferred embodiment of the invention installed in a tree with optional universal game camera bracket.

In the exemplified embodiments, the extension pole 17 is one piece. It is noted however that the pole can telescope to reach and place the mounting system higher. Further, several poles can be connected together to create a longer pole. The telescoping connection and the pole need only be rigid enough to manipulate the pieces when assembling the system. FIG. 15 shows a preferred embodiment of a connector 140 that can be used to join two extension poles to one another. One end of the connector 128 is affixed to an end of one extension pole 130 opposite the pole fitting. The connector fitting end 132 of the connector engages the extension pole fitting 16 of a second extension pole. It is noted that in this embodiment the fitting that complements the fitting on the extension pole has a ramp 134 entering a pit 136 that is engaged by the snap button 72 on the extension pole 17 unlike the embodiment shown in FIG. 9 where the snap button 72 engages a collar 74. FIG. 11 shows an alternative embodiment in which the snap button 72 engages a pit 136.

Figure 33:
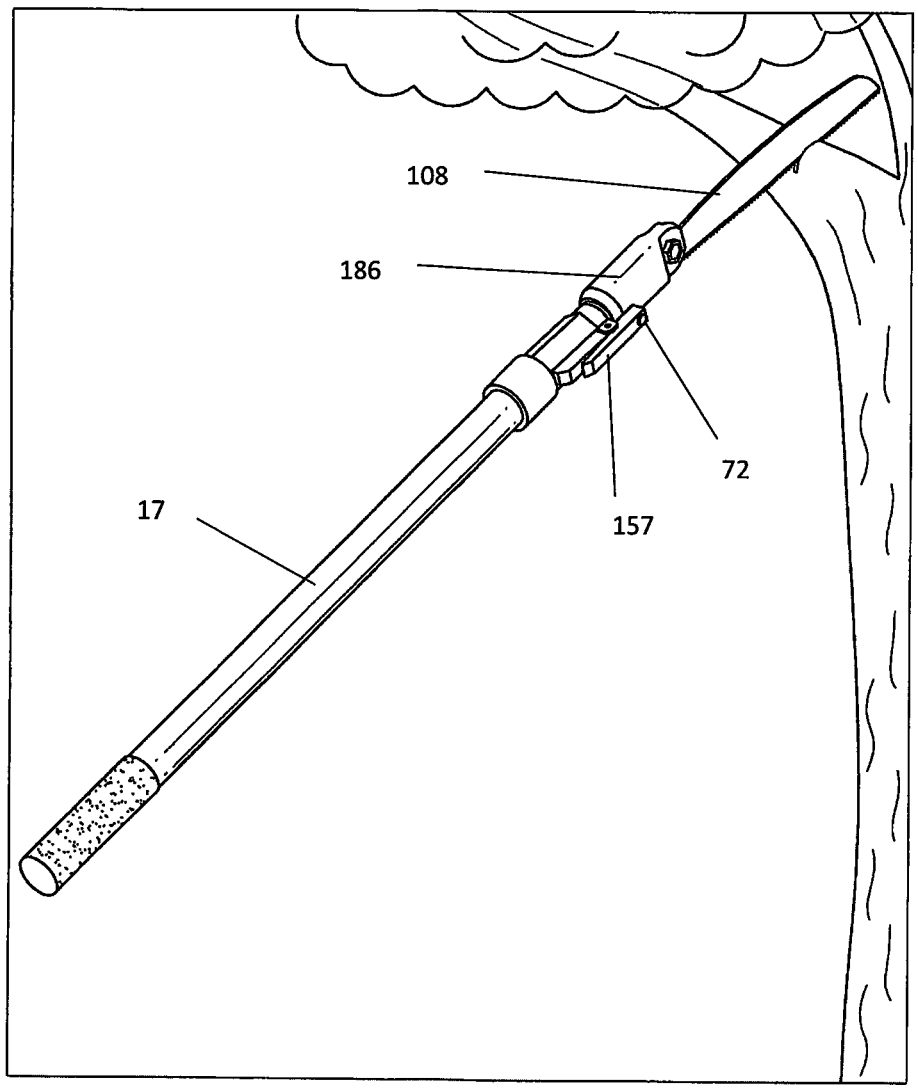
FIG. 33 is an environmental perspective view of saw blade attachment in use with extension pole.

To mount the subject system a tree or tree part of suitable strength is chosen to support the system. A knife or saw 108 can be adapted to the fitting in the extension pole to allow the user to clear brush and prepare the area to mount the system (FIGS. 14 and 33). The support, with an auger anchoring means, for example, is then inserted into the extension pole. The auger is raised to the branch with the extension pole and driven into the branch by turning the extension pole. Once the auger is seated in the branch, the extension pole is removed. Any desired accessory is attached to the utility bar. The utility bar is inserted into the extension pole. The utility bar is connected to the auger by the releasable capture means. The extension pole is removed. At any time, the utility bar and its attached accessory can be removed for maintenance and replaced. To remove the system, the extension pole is raised to engage the fitting end of the utility bar and the utility bar is released from the auger by disconnecting the capture means and lowering it from the tree. The extension pole is then used to loosen the auger from the tree.

In another preferred embodiment, shown in FIGS. 16-34, the support 10 is comprised of an injection molded tree attachment 150, a utility bar 40, comprising a ball mount 151, and camera mount 152. The system is installed by using an extension pole 17 with releasable capture means. Once installed, a camera 41 can be accurately aimed by using a laser attachment 153 and standard laser pen light 154. This system is further comprised of a saw 108 attachment, which can be used to clear branches from the installation area of the tree being utilized.

Figure 18:
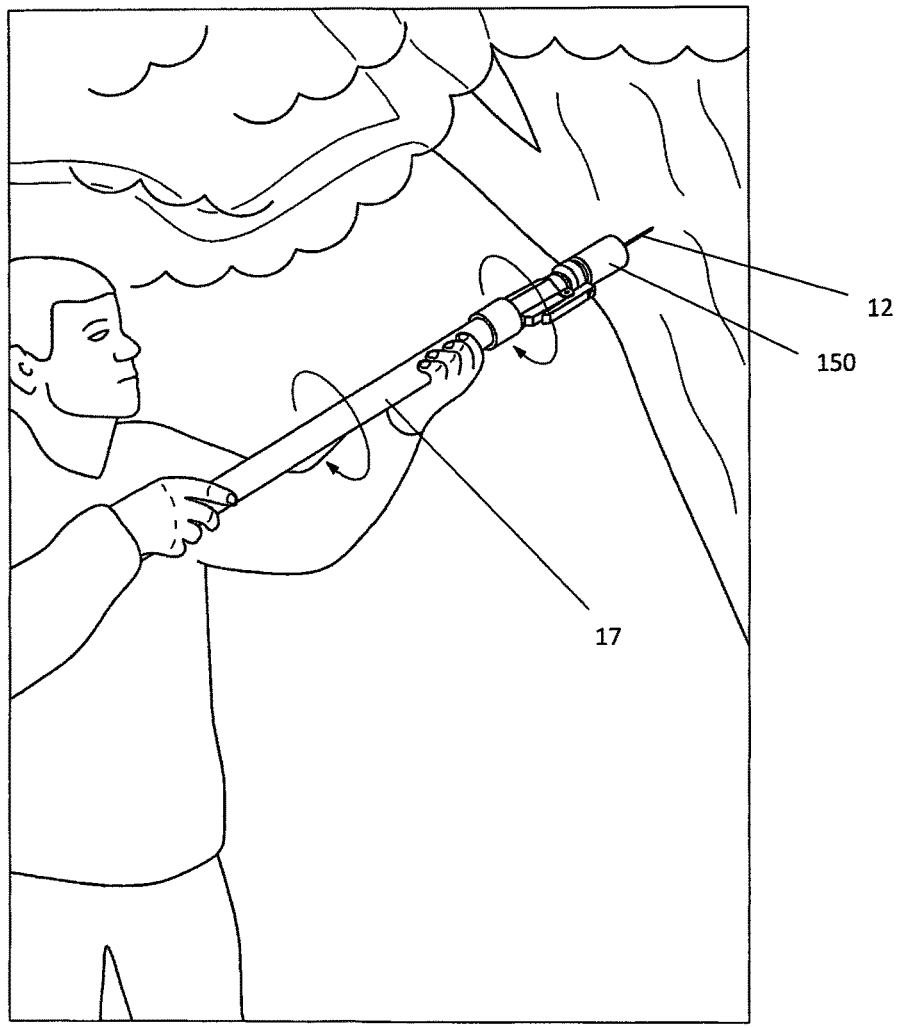
FIG. 18 is an environmental perspective view of a user installing the tree attachment of a preferred embodiment of the subject invention.
Figures 25, 26:
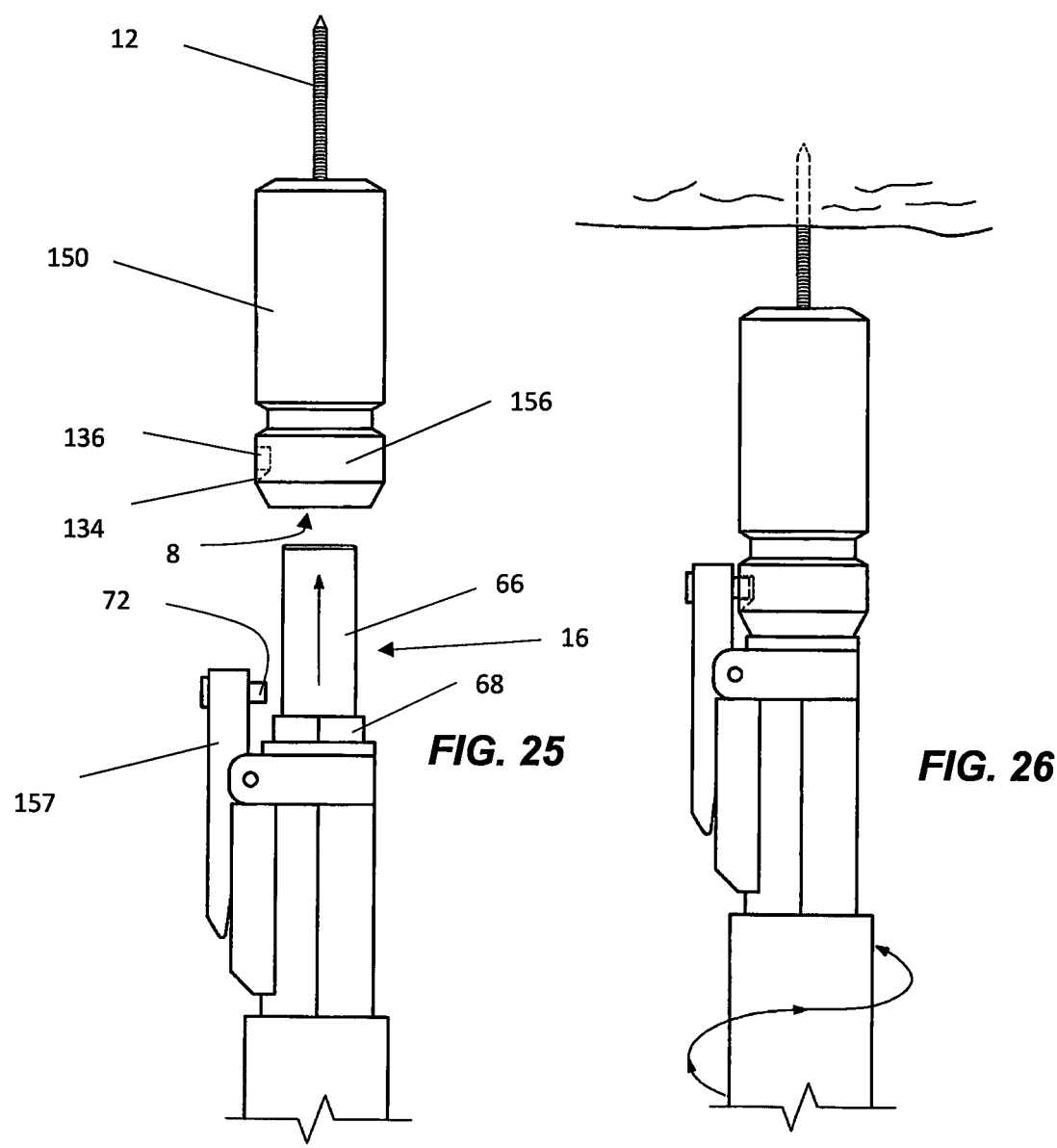
FIG. 25 is a side elevational view demonstrating releasable capture means of distal extension pole and tree attachment.
FIG. 26 is a side elevational view showing releasable capture means engaged for installation of tree attachment.
Figure 29:
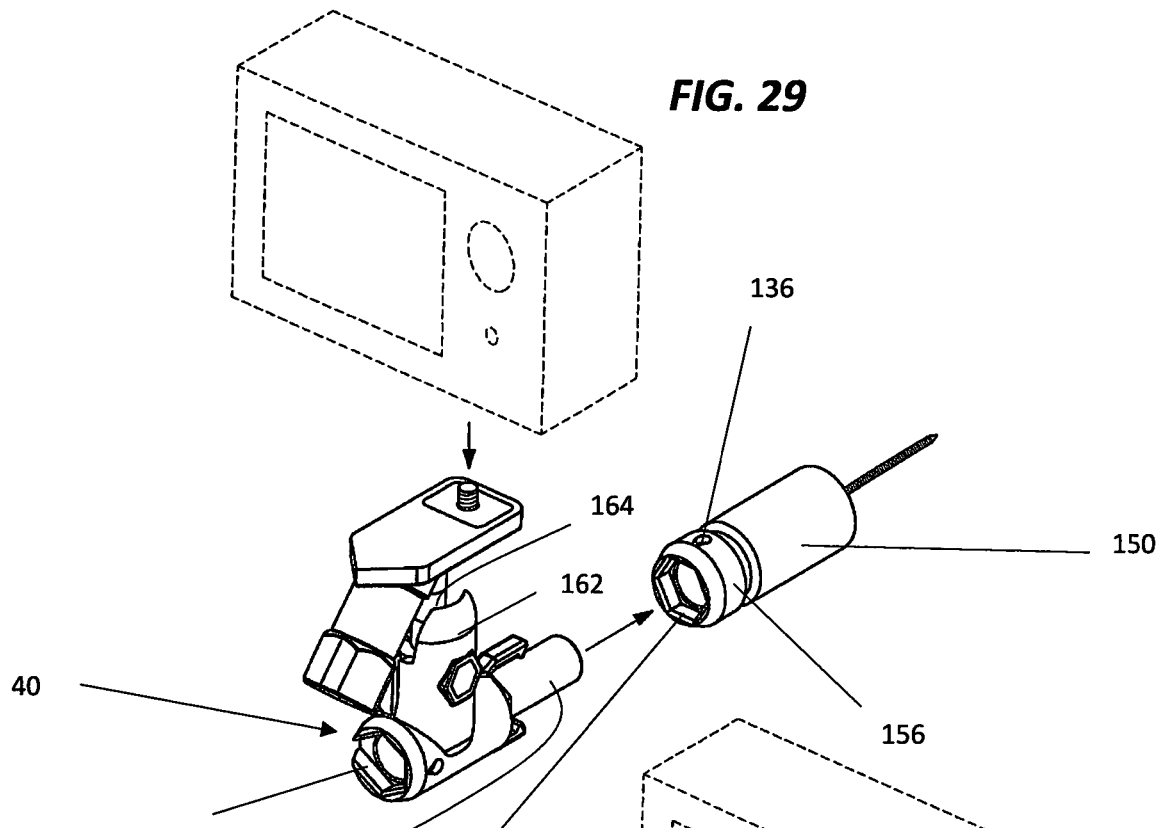
FIG. 29 is a perspective view of direct camera mounting on camera mount with mounting screw and attachment means of ball mount to tree attachment.
Figure 30:
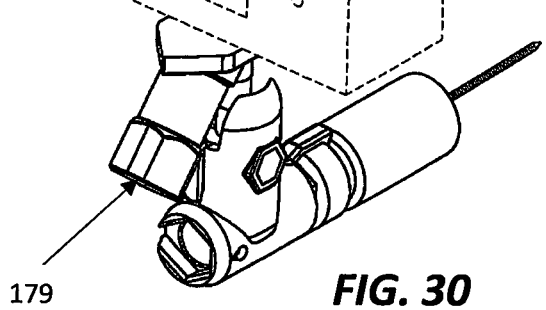
FIG. 30 is a perspective view of camera mounted on subject invention and ball mount installed on tree attachment.
Figure 31:
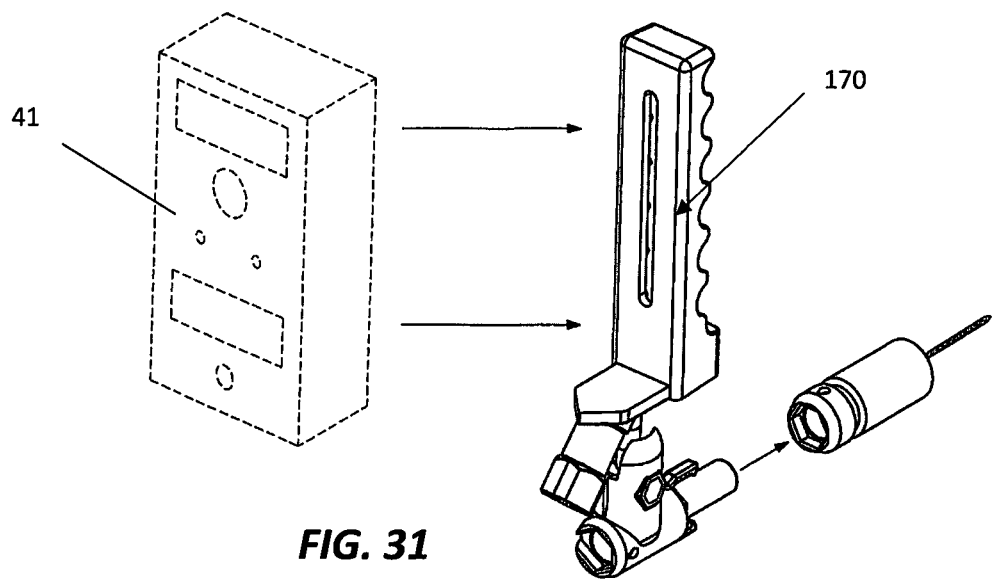
FIG. 31 is a perspective view of universal game camera mounting bracket mounted on subject invention and attachment means of ball mount to tree attachment.
Figure 32:
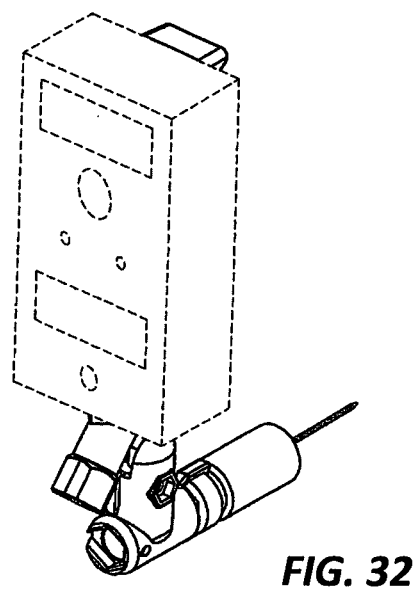
FIG. 32 is a perspective view of game camera mounted on universal game camera mounting bracket mounted on subject invention and ball mount installed on tree attachment.

The injection molded tree attachment 150, is comprised of an auger 12 tip screw at the distal end, and hexagon shaped receiving recess 155 at the proximal end. A cuff 156 at the proximal receiving end of the tree attachment 150 contains a pit 136, which receives snap button 72 disposed on the distal portion of the spring loaded securing clasp 157 located at the distal end of the extension pole 17. FIGS. 25-26. Said snap button 72 engages said pit 136 by entering the pit via a recessed ramp 134. The hexagon shaped receiving recess 155 receives a post 66 with correspondingly shaped hexagonal neck 68 at its base. The snap button 72 of the spring loaded securing clasp 157 of the distal end of the extension pole 17 simultaneously engages the cuff 156 pit 136. Once the tree attachment 150 is engaged on the distal end of the extension pole 17, the user can extend the pole and drive the tree attachment with auger 12 tipped screw into a tree branch by rotating the extension pole clockwise as shown in FIGS. 18 and 26. Once the tree attachment 150 is placed in the tree, the remainder of the system can be mounted.

Once the tree attachment 150 auger 12 tip screw is driven a sufficient depth into the tree to achieve solid fixation, the extension pole 17 can be disengaged by the user by firmly pulling the extension pole away from the tree attachment 150. The ramp 134 of the cuff 156 pit 136 allows the snap button 72 to slide out of the pit 136 thus disengaging the extension pole 17 from the installed tree attachment 150.

This embodiment is further comprised of a utility bar 40, where the distal end comprises the utility bar releasable capture means 38b and is fitted with two tree attachment clasps 158, which provide a secure, but releasable capture means 38 to secure the utility bar 40 to the support releasable capture means 38a of the tree attachment 150. The support releasable capture means 38a are comprised of tree attachment clasps 158 clasp the shelf 159 formed by the receiving end cuff 156, and tree attachment neck 160 which secures the utility bar 40 to the tree attachment 161 as shown in FIG. 23. The utility bar 40 is further comprised of a ball mount 151, an upper camera mount ball housing 162 and a ball mount cap 163, which house the camera mount ball 164. The camera mount ball housing 162 and ball mount cap 163 can be tensioned together to allow less or more movement of the camera mount ball 164. The tensioning means in this embodiment includes the use of a standard bolt 165 installed through a corresponding hole in the camera mount ball housing 162 and ball mount cap 163. A corresponding thumbscrew 185 can then be tightened or loosened to allow movement of the camera mount ball 164 to user preference.

The upper surface of the camera mount ball 164 contains a hole, which accepts the camera mount post 166. Once the camera mount post 166 is seated within the camera mount ball 164, the camera mount 152 can be positioned to user preference. The top camera mounting surface 167 of the camera mount 152 is further comprised of a removable camera mount pad 168, which provides a level surface for camera mounting. A camera 41 is mounted by utilizing the universal camera screw 169 which protrudes upward from the camera mounting surface 167. A standard game camera 41 can be mounted by first mounting a universal game camera bracket 170 to said mounting surface with the camera mount screw 169. A game camera can then be mounted to the game camera bracket 170 with standard mounting means available on game cameras.

Figure 19:
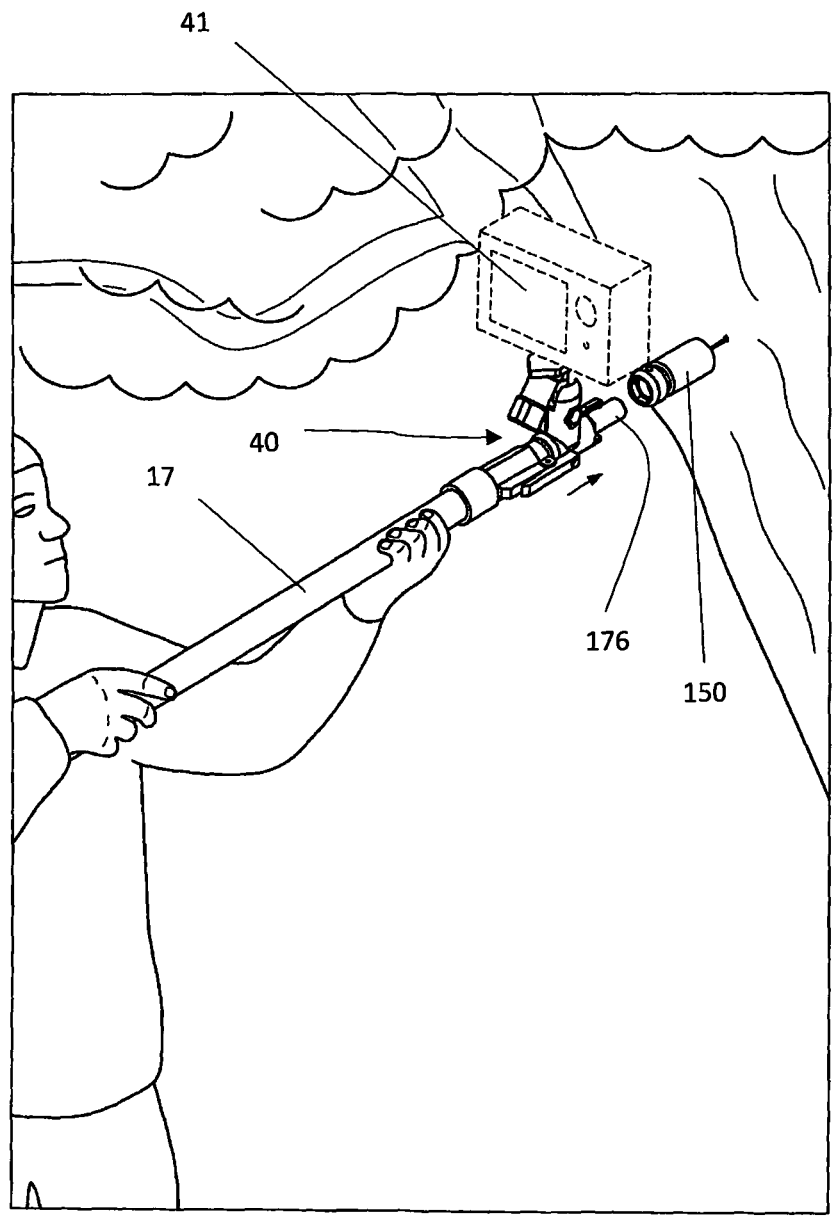
FIG. 19 is an environmental perspective view of a user installing the ball mount/camera mount to the tree attachment of a preferred embodiment of the subject invention.

Once the utility bar 40 is ready for installation onto the tree attachment 150, the user inserts the post 66 of the distal end of the extension pole 17 into the proximal receiving end 172 of the utility bar 40 as shown in FIG. 21. The extension pole's hexagonal neck 68 fully engages the utility bar hexagon receiving recess 174. Simultaneously, snap button 72 of the spring-loaded clasp 157 of the distal extension pole engages the "install" recess pit 175 of the proximal utility bar. The user can then extend the pole to install the utility bar 40 onto the secured tree attachment as shown in FIG. 19. To install the utility bar 40, the user directs the distal end 176 of the utility bar into the tree attachment 150 hexagon receiving recess 155 until the distal hexagonal neck 177 of the utility bar is fully engaged. Simultaneously, the tree attachment clasps 158 engage the shelf 159 formed by the receiving end cuff 156, and tree attachment distal neck 160 which secures the utility bar 40 to the tree attachment 161 as shown in FIG. 22-23.

Figure 20:
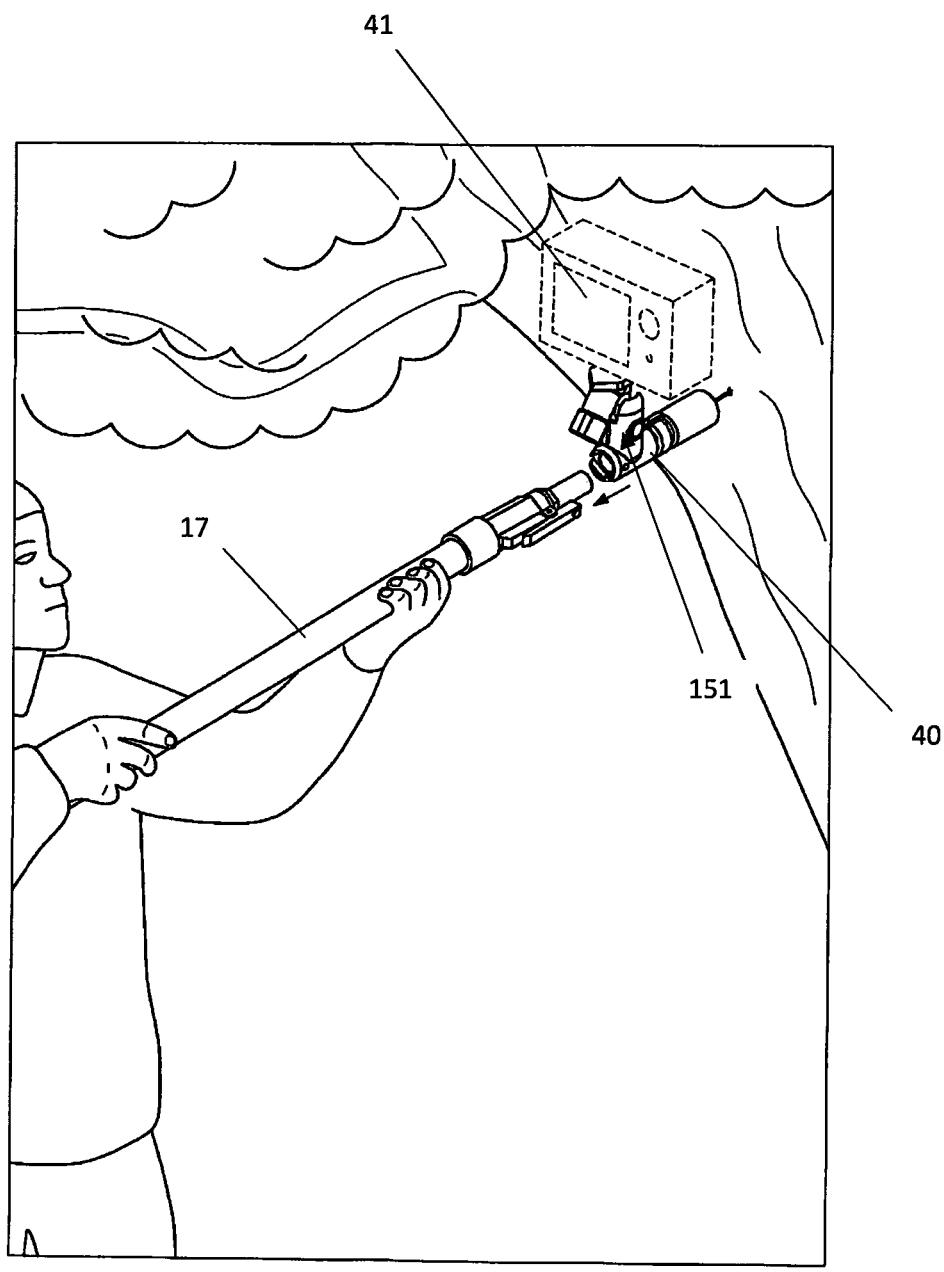
FIG. 20 is an environmental perspective view of a user detaching extension pole from ball mount after installing the ball mount/camera mount to the tree attachment of a preferred embodiment of the subject invention.

Once the utility bar 40 is installed onto the tree attachment 150, the user disengages the extension pole 17 by firmly pulling the extension pole away from the utility bar 40 as shown in FIG. 20. The ramp 134 of the utility bar "install" recess pit 175 allows the extension pole snap button 72 to slide out of the utility bar "install" recess pit 175 because the tree attachment clasps 158, clasp the tree attachment shelf 159 with more force than the longitudinal force generated when the extension pole snap button 72 clasp is disengaged from the utility bar "install" recess pit 175, thus allowing the utility bar to be retained on the tree attachment 150.

Figure 34:
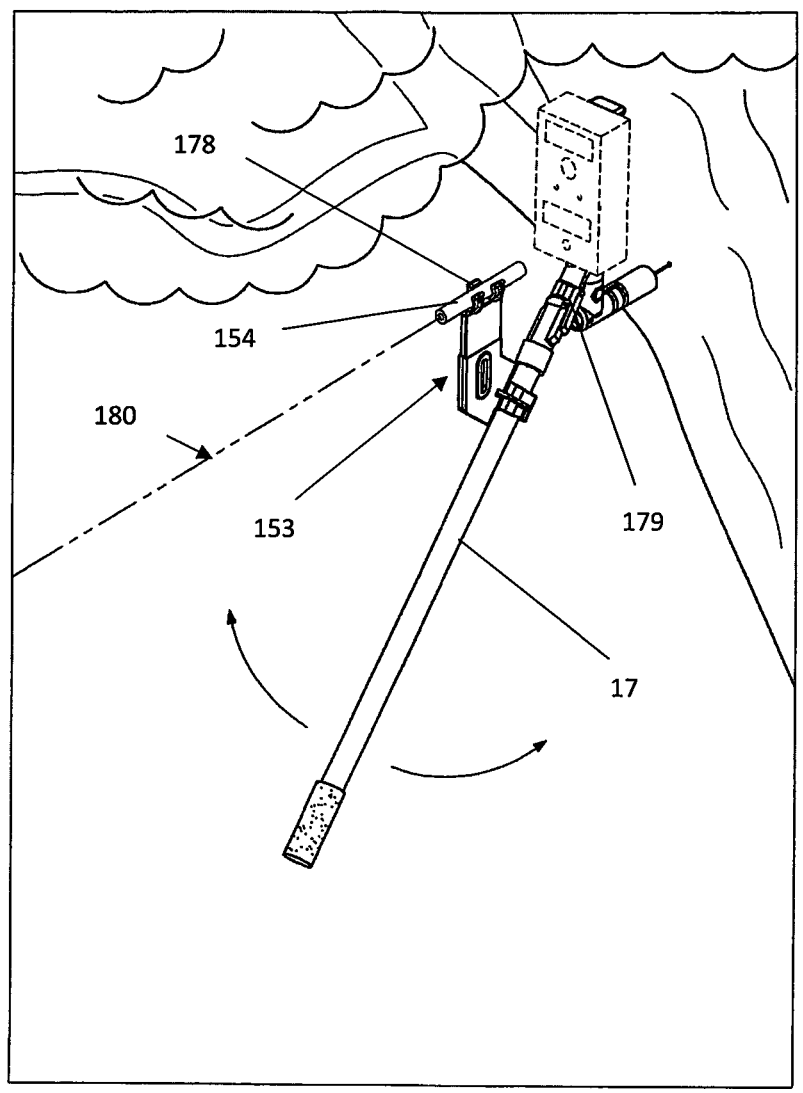
FIG. 34 is an environmental perspective view of laser attachment and manipulation of camera mount to aim camera to desired recording area.

Once the utility bar 40 is secured onto the tree attachment 150, with mounted camera 41, the camera mount 152 can be accurately aimed by using a laser attachment 153 as shown in FIG. 34. Said laser attachment 153 clips on to the distal end of the extension pole 17. A standard laser pen light 154 is then placed in the pen light clasp 178 and turned on. The distal post 66 of the extension pole 17 is then inserted into the proximal camera mount receiving recess 179. The laser attachment 153 with laser pen 154 and mounted camera 41 are then aligned so the projected laser dot 180 shows the area where the camera 41 will be recording. The user then manipulates the camera mount 152/laser attachment 153 to achieve the desired recording area of the camera.

To remove the system, the user inserts the distal post 66 of the extension pole 17 into the proximal receiving end 172 of the utility bar 40 until the snap button 72 of the spring-loaded clasp 157 of the extension pole clasps the "remove" recess pit 181 of the proximal utility bar receiver. The "remove" recess pit 181 does not contain a ramp 134, thus the snap button 72 cannot slide out of the "remove" recess pit 181. Therefore, the longitudinal force generated by the user by pulling the extension pole 17 away from the utility bar 40, exceeds the holding capability of the tree attachment clasps 158, which allows the utility bar 40 to disengage from the tree attachment 150.

The tree attachment 150 can be uninstalled from the tree by the user inserting the distal post 66 into proximal hexagon shaped receiving end 155 of the tree attachment 150 until the snap button 72 of the spring-loaded clasp 157 of the extension pole 17 clasps the tree attachment 150 cuff 156 pit 136. The extension pole 17 is then rotated counterclockwise to unscrew the auger 12 tip from the tree.

In another embodiment, the proximal end of the extension pole 17 receives a drill adapter 120, which allows the use of a powered drill 182 during installation and removal of the tree attachment 150. Said adapter is comprised of a post 66; hexagon shaped neck 124 at the base of said post 66; and a drill attachment post 122. FIGS. 27-28. To utilize the adapter 120, the user simply secures the drill attachment post 122 in a standard drill chuck 183 in the same manner any drill bit would be engaged for use in said drill. The user then inserts the adapter post 66 into the hexagon shaped receiving end 184 of the extension pole 17, until the hexagon shaped neck 124 fully engages the hexagon receiving shaped receiving end 184. When the adapter 120 is fully engaged, the drill 182 can be operated to install or remove the tree attachment as shown in FIG. 28.

In yet another embodiment a saw 108 can be mounted to an injection molded adapter 186, which connects to the distal end of the extension pole 17 to allow for clearing of branches from the installation site of the system as shown in FIG. 33. Said saw adapter 186 would engage the distal end of the extension pole 17 with the same means as already described for the tree attachment 150 above.

The mounting system of the subject invention safely installs a trail camera high in a tree. This not only protects the camera from damage and theft, but prevents the person installing the camera from dangerously climbing up and down the tree or balancing preciously on a ladder on unstable ground. The system is versatile and can be configured to support not only cameras, but lights or other accessories. It also can be used to hoist a load into the tree on which it is mounted.

It is understood that the foregoing examples are merely illustrative of the present invention. Certain modifications of the articles and/or methods may be made and still achieve the objectives of the invention. Such modifications are contemplated as within the scope of the claimed invention.

What is claimed is:

1. A method of installing a mounting system comprising the steps of:
   a. connecting a proximal end of an attachment to a distal end of an extension pole with releasable capture means;
   b. boring a distal end auger of said attachment into a mounting surface;
   c. releasing said extension pole from said attachment;
   d. connecting a proximal receiving end of a ball mount/camera mount to said distal end of said extension pole with releasable capture means;
   e. connecting a distal end of said ball mount/camera mount to said proximal end of said attachment with releasable capture means; and
   f. releasing said extension pole from said ball mount/camera mount while the connection between said ball mount/camera mount and said attachment is maintained.

2. The method of installing the mounting system of claim 1 further comprising, extending said extension pole to install said attachment and said ball mount/camera mount on said mounting surface high off the ground.

3. The method of installing the mounting system of claim 1 further comprising using a drill attachment to bore said distal end auger of said attachment into said mounting surface.

4. The method of installing the mounting system of claim 1 further comprising, using a laser attachment to aim said ball mount/camera mount to a desired recording area.

5. The method of installing the mounting system of claim 4 further comprising the steps of:
   a. clipping said laser attachment on to the distal end of said extension pole;
   b. placing a laser pen light into a pen light clasp of said laser attachment;
   c. inserting a distal pole post of said extension pole into a proximal camera mount receiving recess of said ball mount/camera mount; and
   d. manipulating said ball mount/camera mount with said extension pole to aim said laser pen light to said desired recording area.

6. The method of installing the mounting system of claim 1 further comprising using a saw attachment to clear branches from said mounting surface.

7. The method of installing the mounting system of claim 6 further comprising:
   a. connecting said saw attachment to a distal end of said extension pole;
   b. extending said extension pole to reach branches to be cleared from said mounting surface; and
   c. sawing said branches to be removed from said mounting surface.

8. A method of installing a mounting system comprising the steps of:
   a. connecting a proximal end of an attachment to a distal end of an extension pole with releasable capture means;
   b. boring a distal end auger of said attachment into a mounting surface;
   c. releasing said extension pole from said attachment; and
   d. connecting a proximal receiving end of a ball mount/camera mount to said distal end of said extension pole with releasable capture means.

9. The method of installing the mounting system of claim 8 further comprising the step of connecting a distal end of said ball mount/camera mount to said proximal end of said attachment with releasable capture means.

* * * * *